April 27, 1971 H. W. GROCE ET AL 3,576,704
PLEAT STUFFED UPHOLSTERY FABRIC
Filed July 3, 1968 26 Sheets-Sheet 1
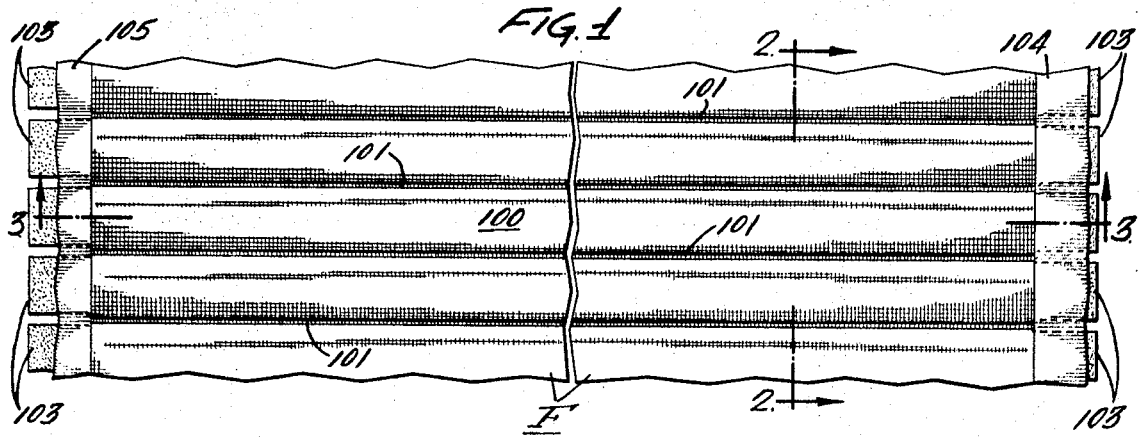
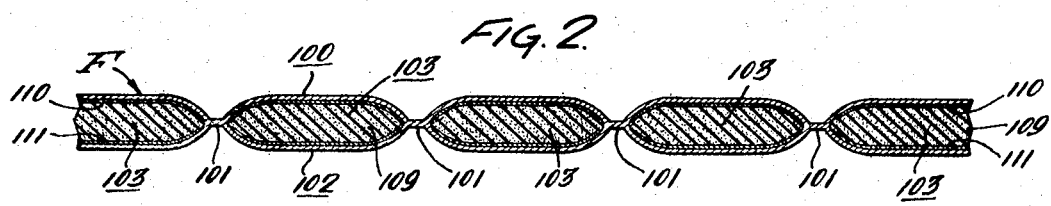
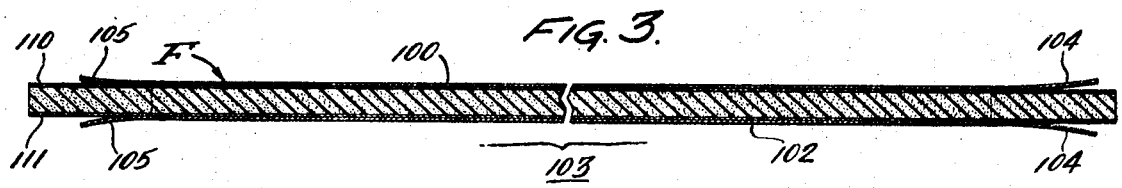
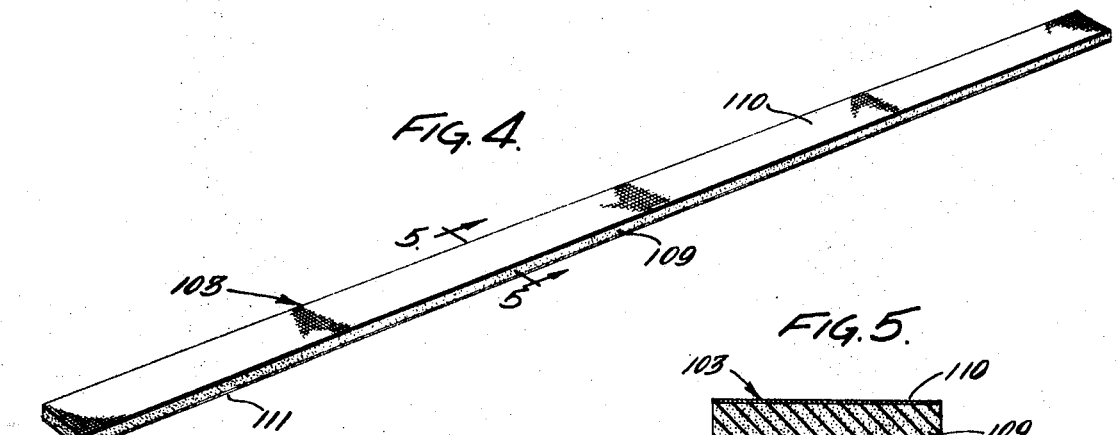
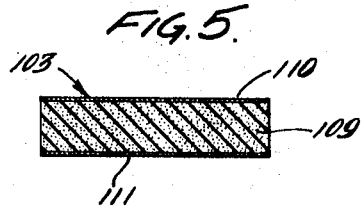
INVENTORS:
HOMER W. GROCE
ARTHUR R. TEAGUE
WILLIAM A. WARNOCK
BY
ATTY.

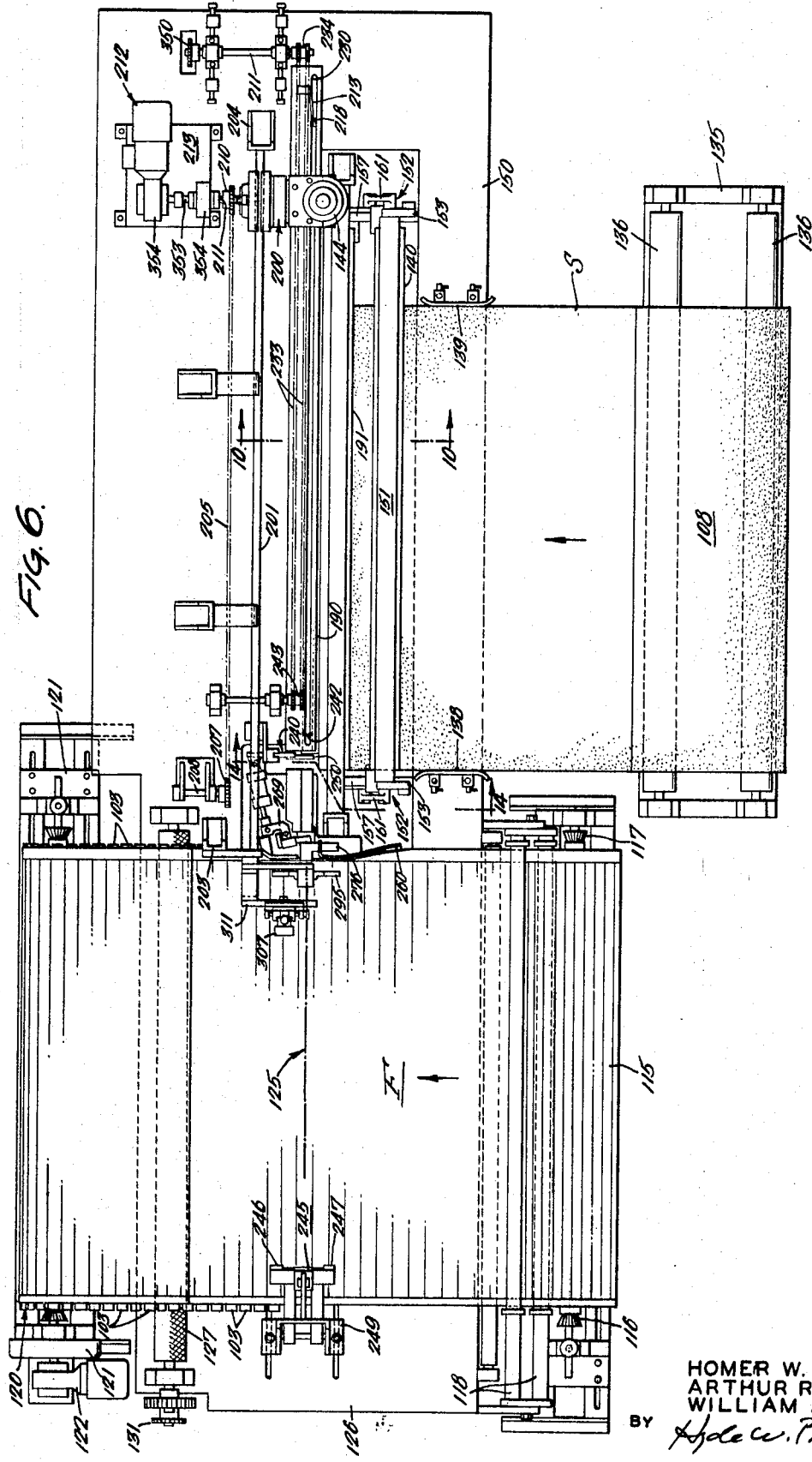

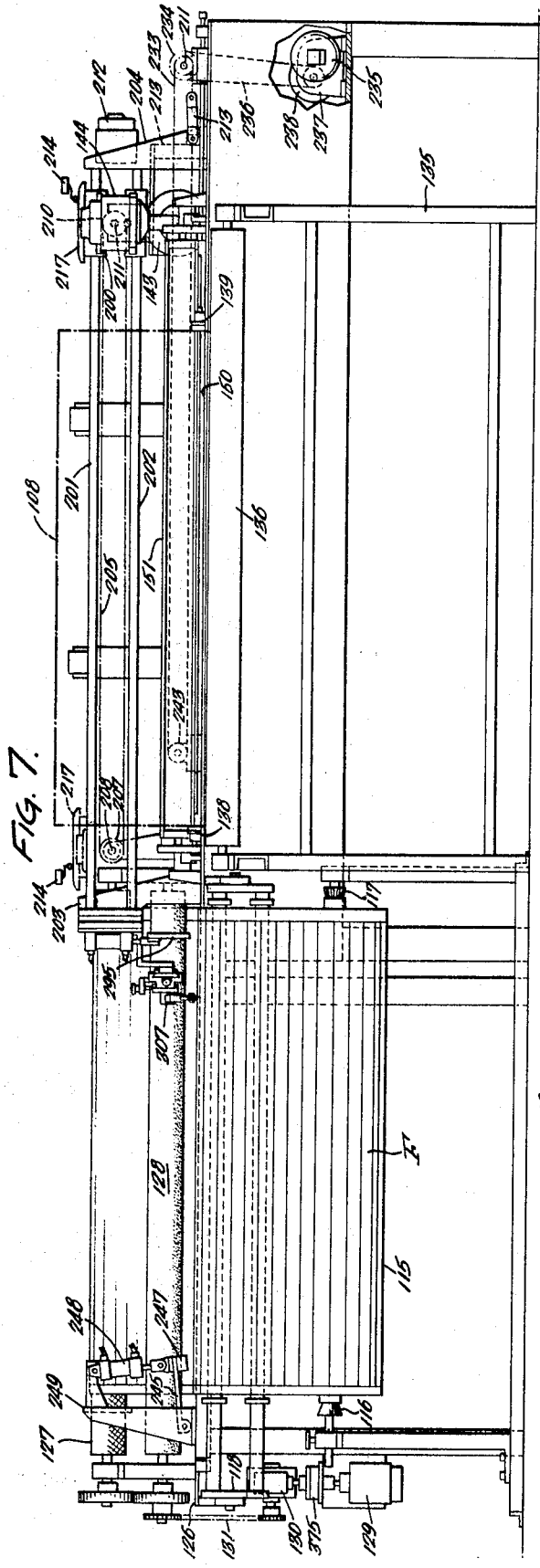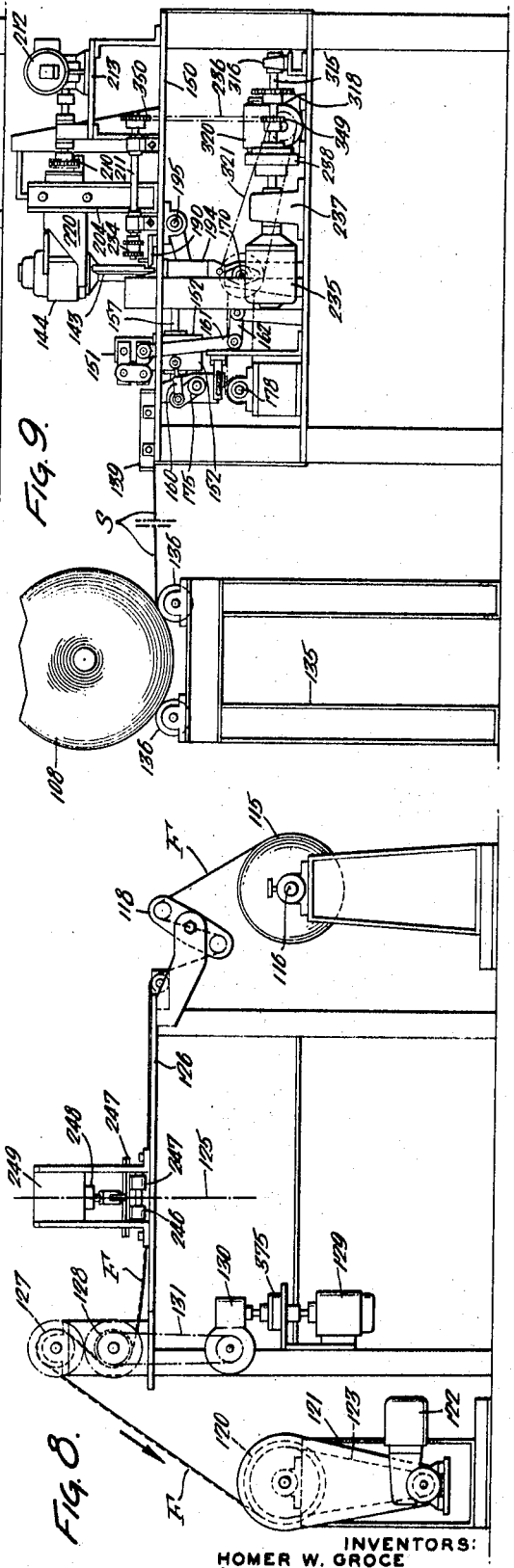

April 27, 1971  H. W. GROCE ET AL  3,576,704
PLEAT STUFFED UPHOLSTERY FABRIC
Filed July 3, 1968  26 Sheets-Sheet 4
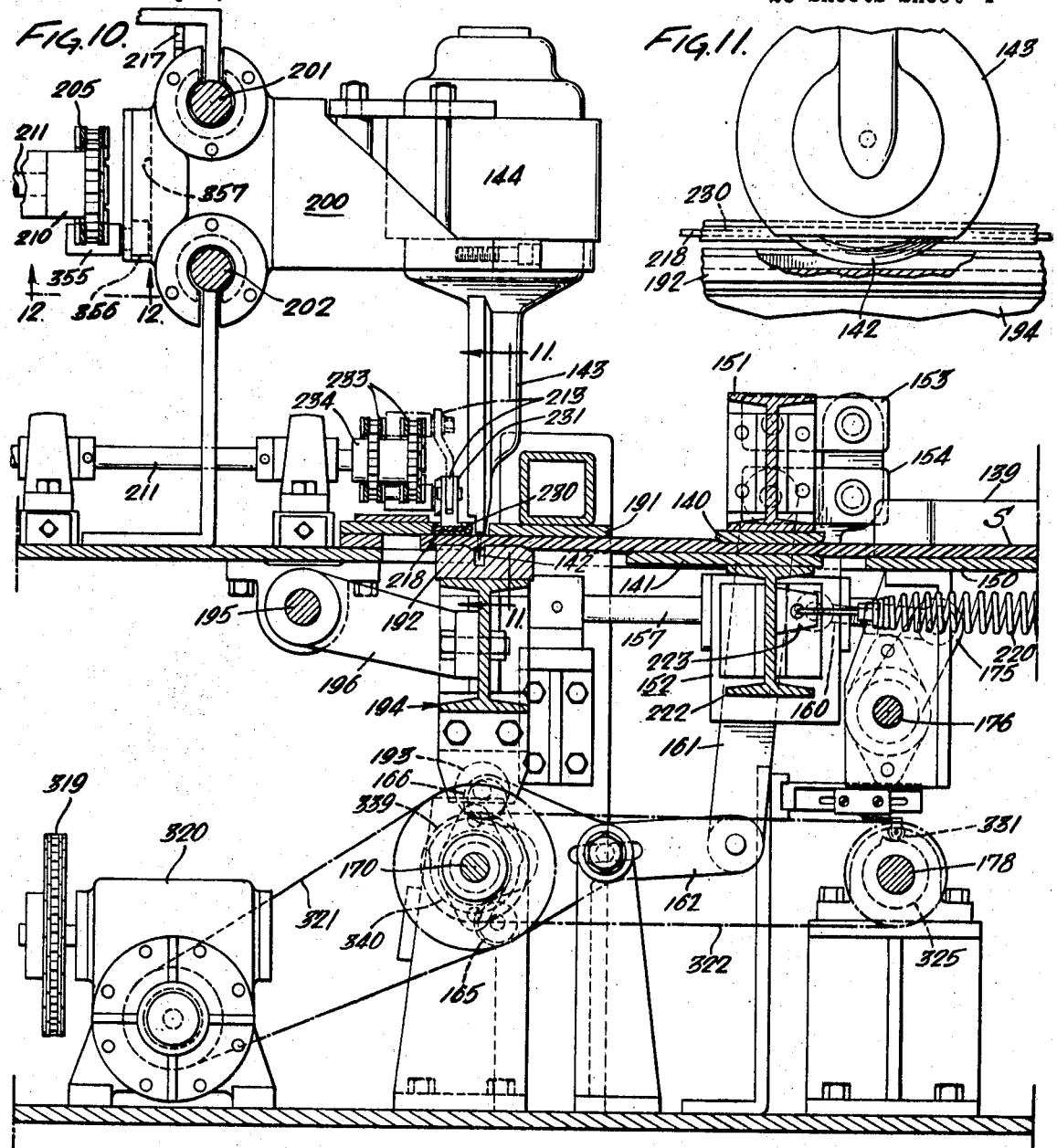
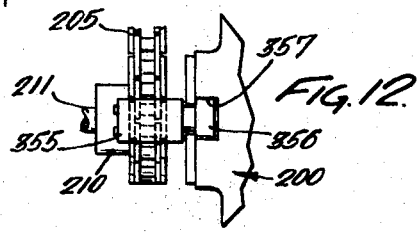
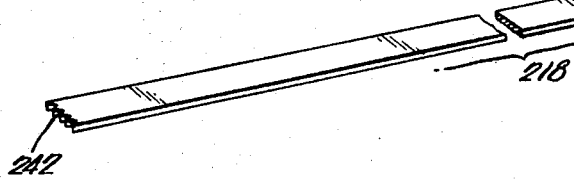
INVENTORS:
HOMER W. GROCE
ARTHUR R. TEAGUE
WILLIAM A. WARNOCK.
BY
ATTY.

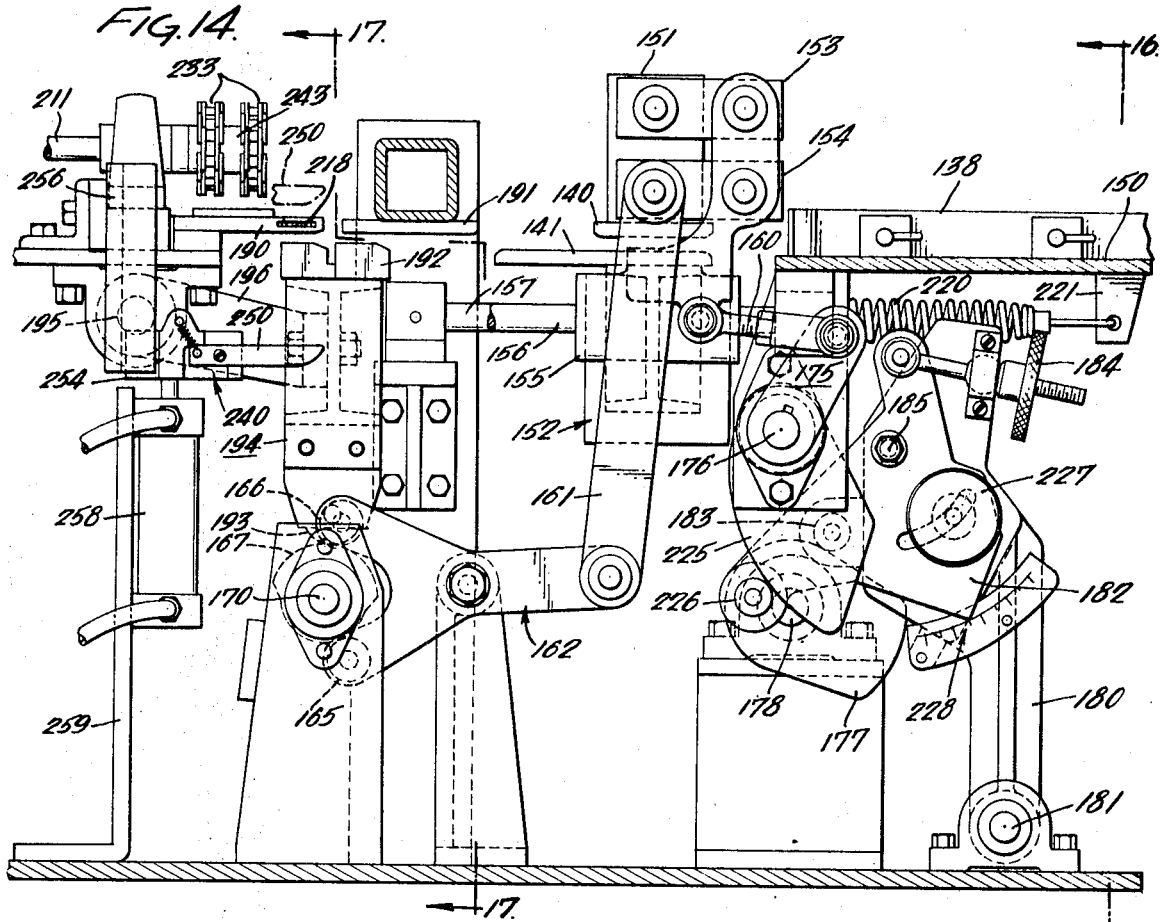
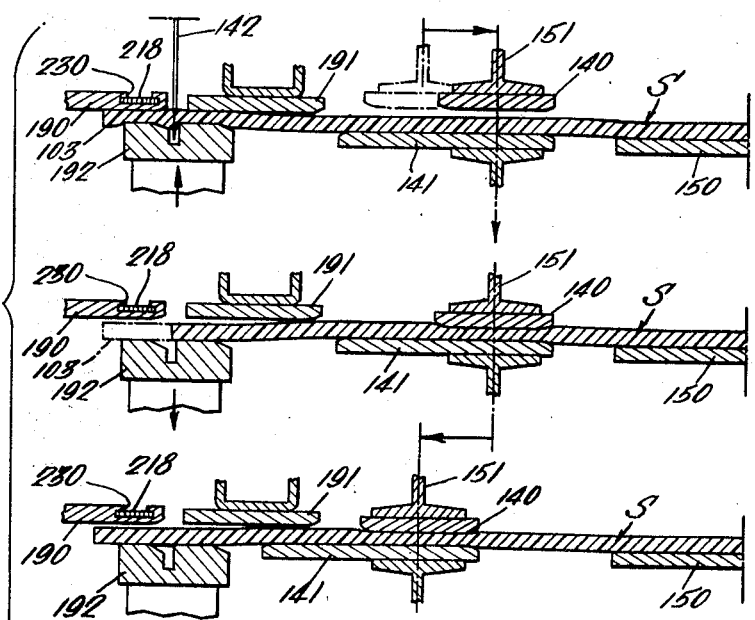

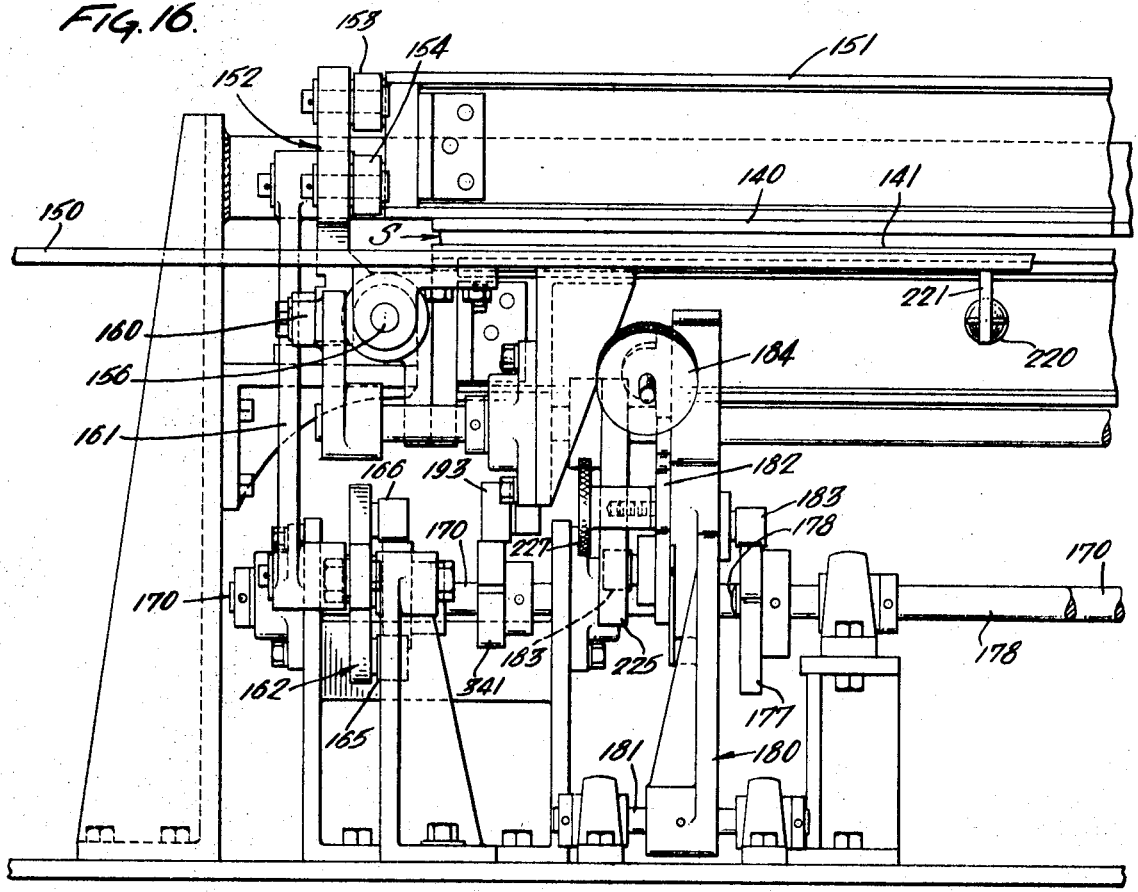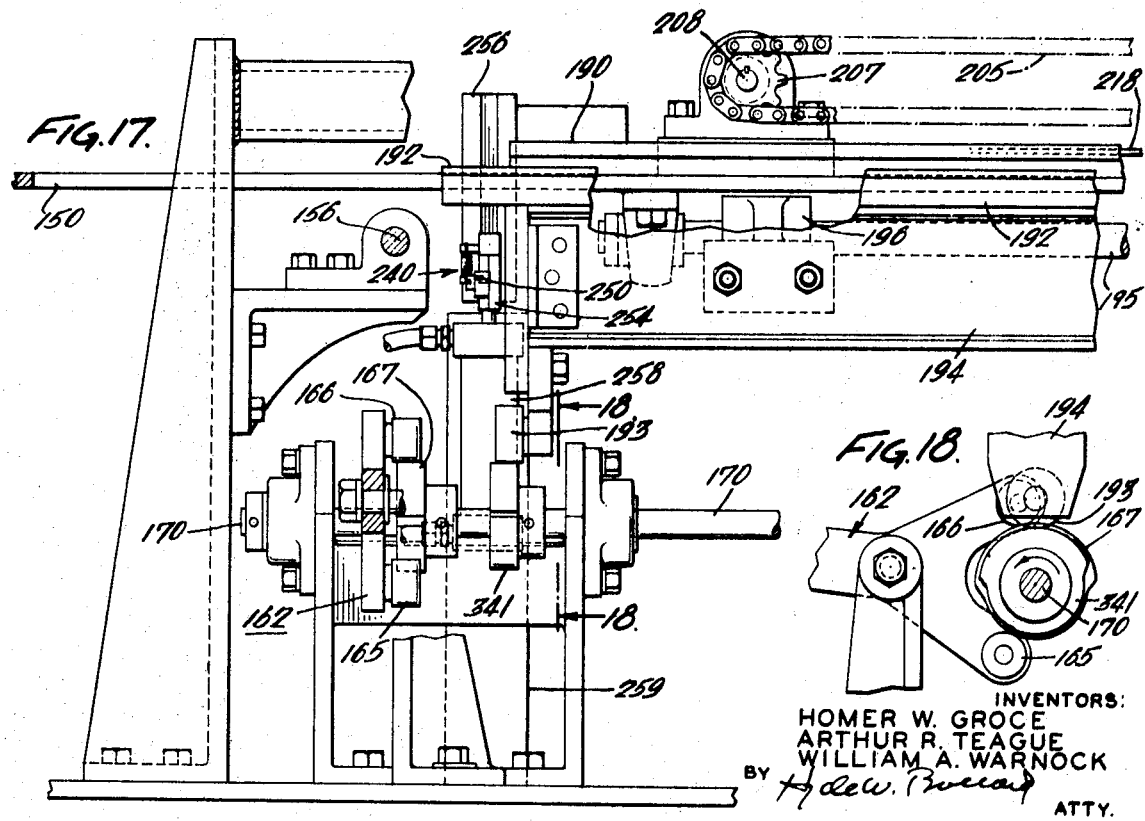

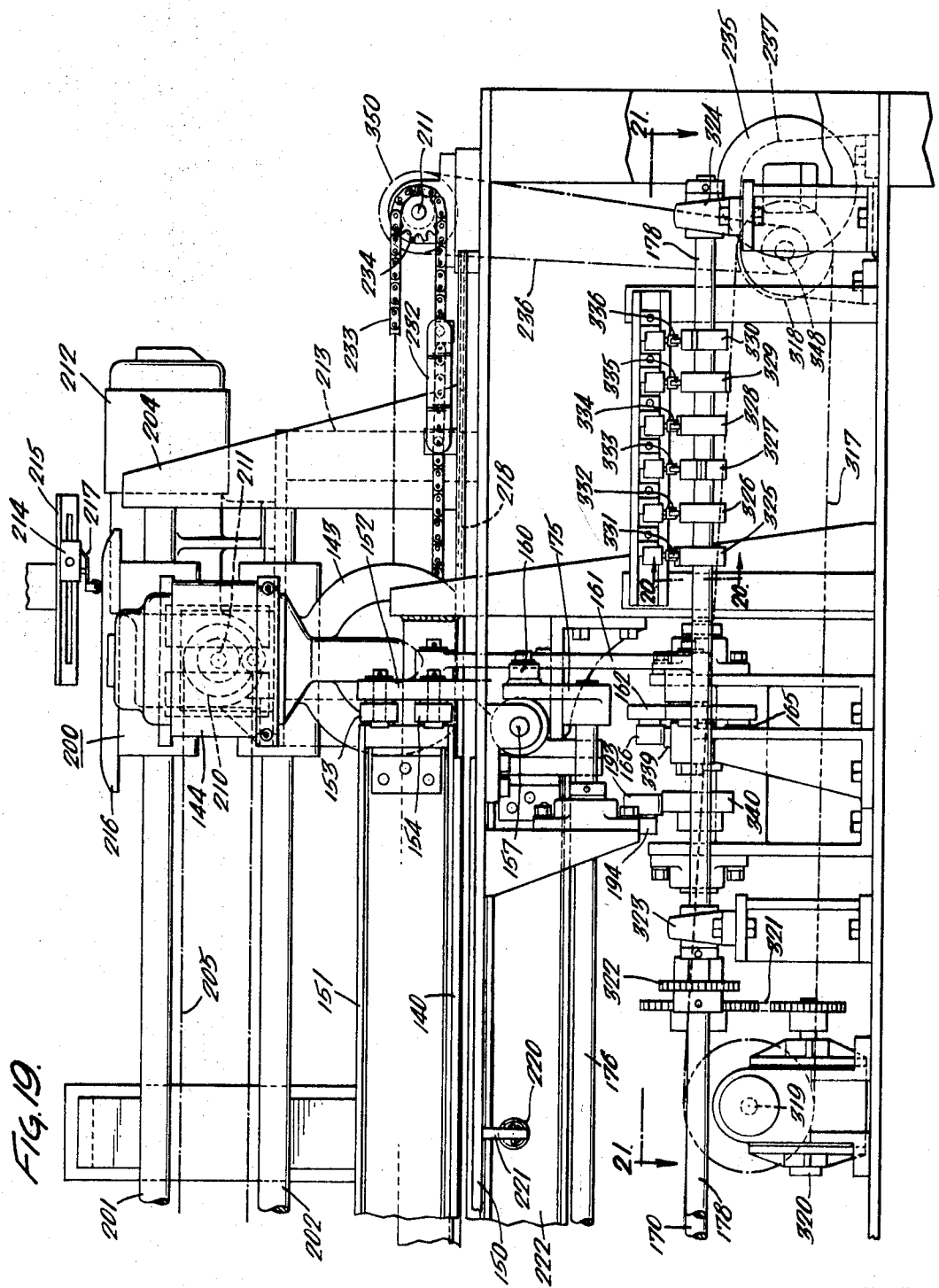

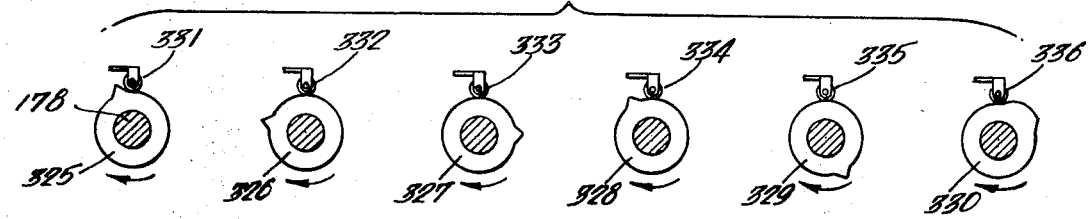
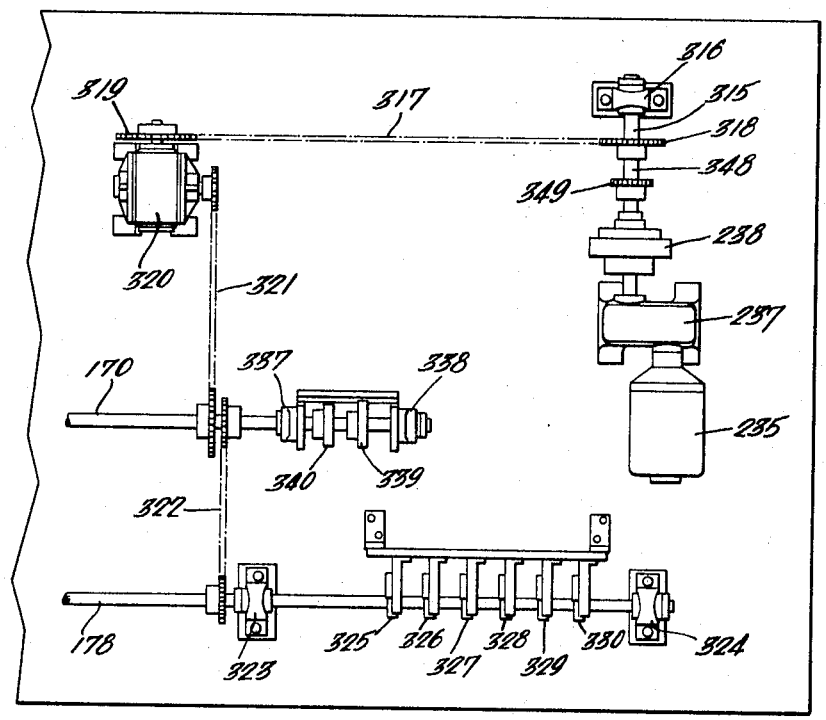

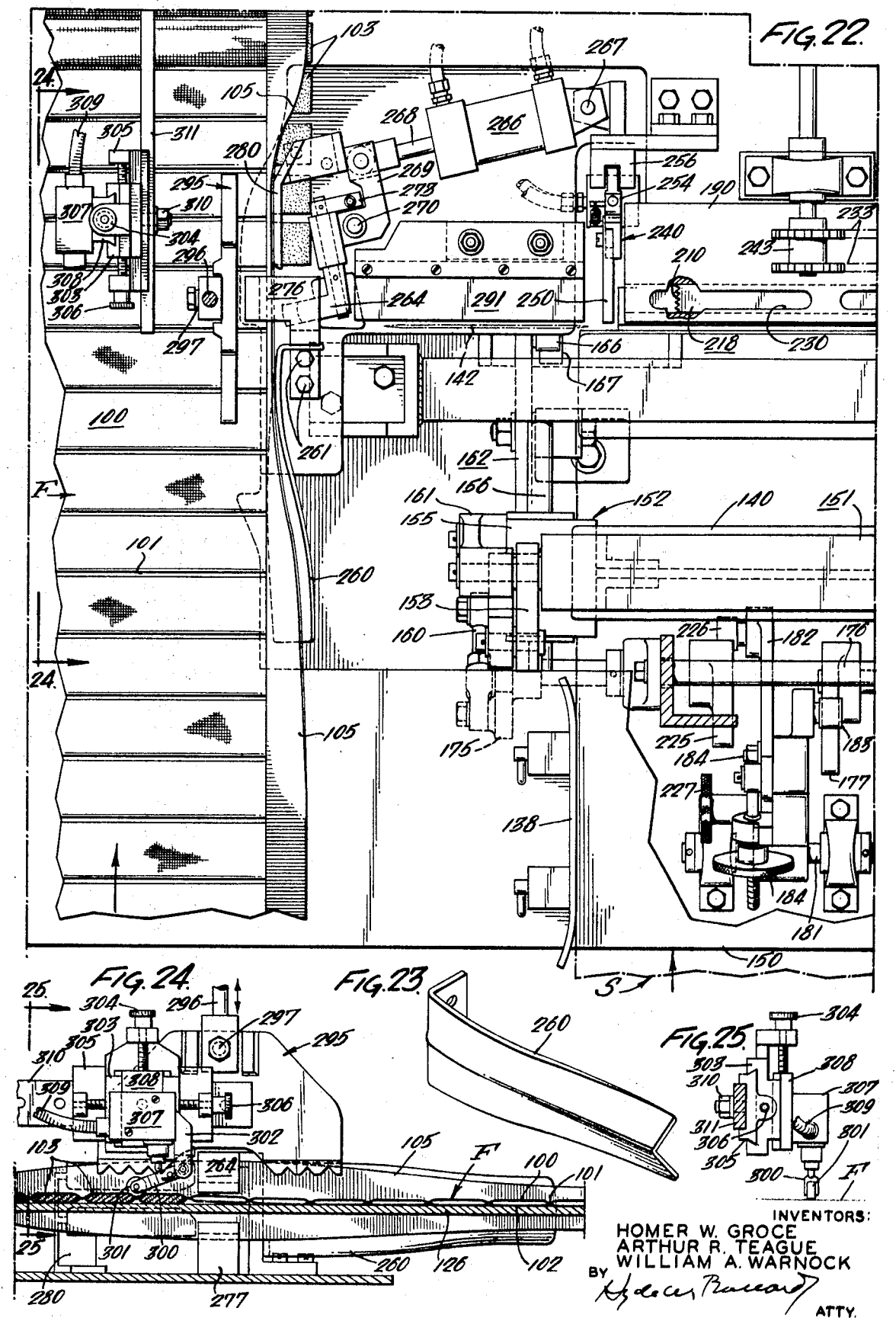

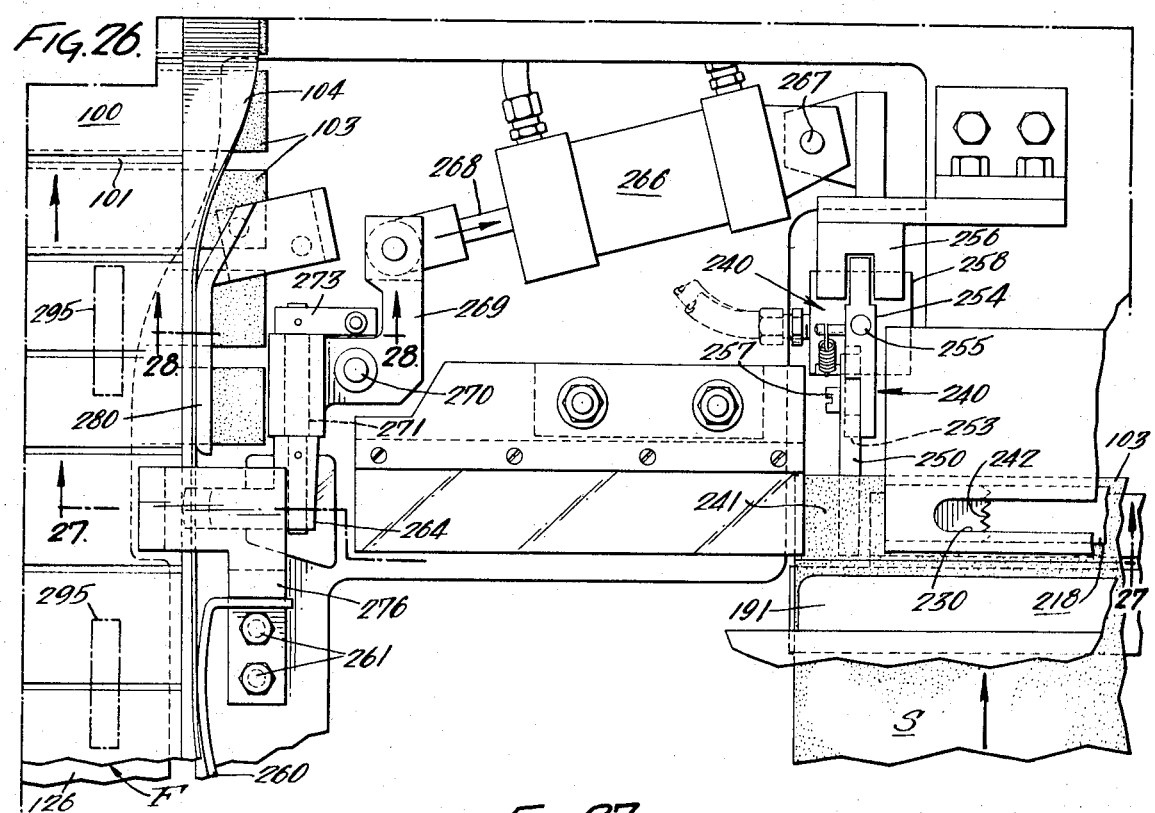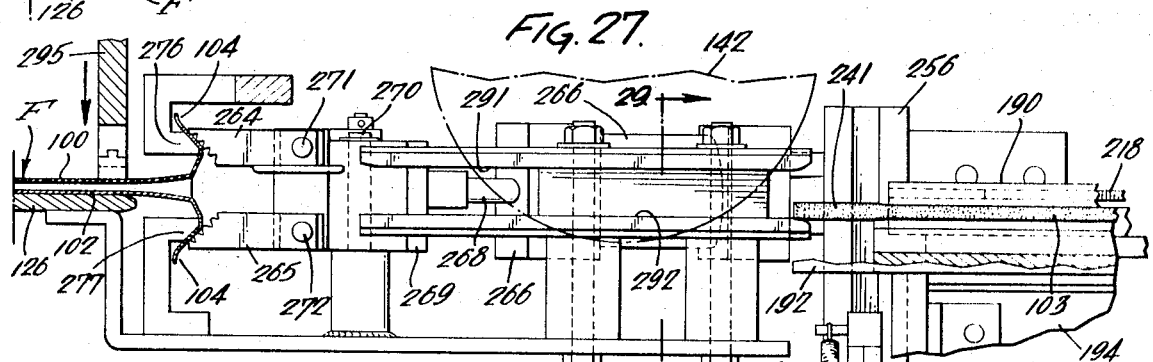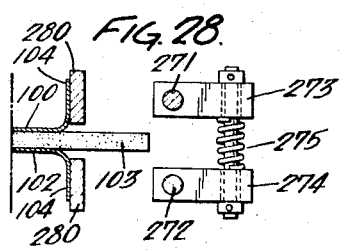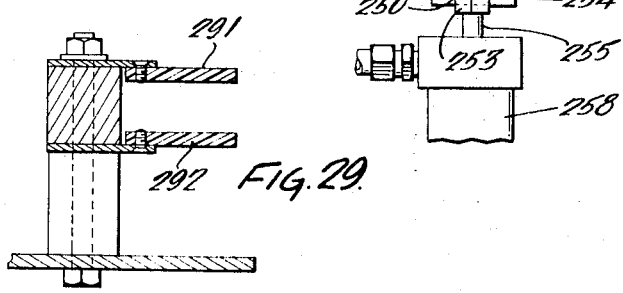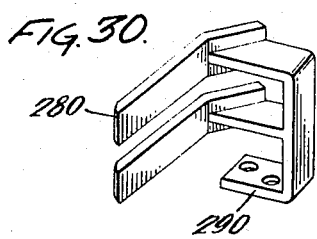

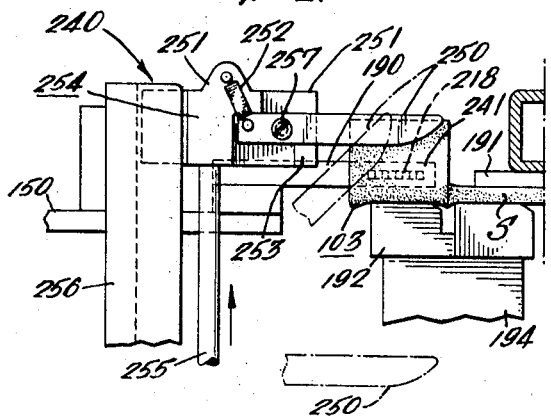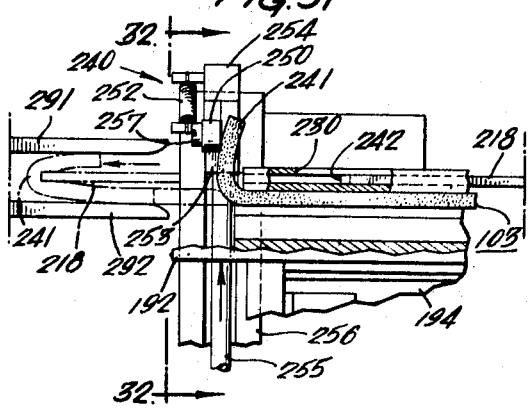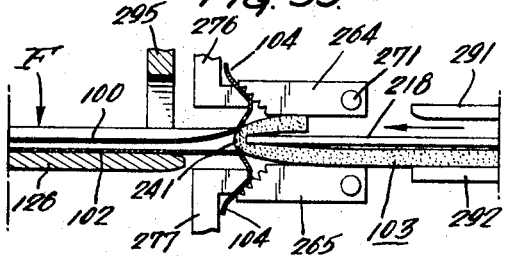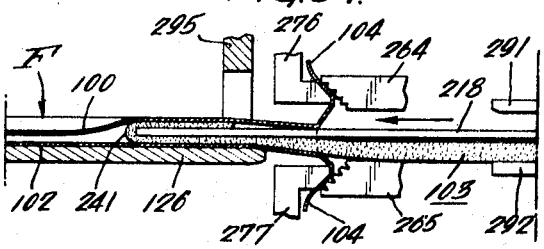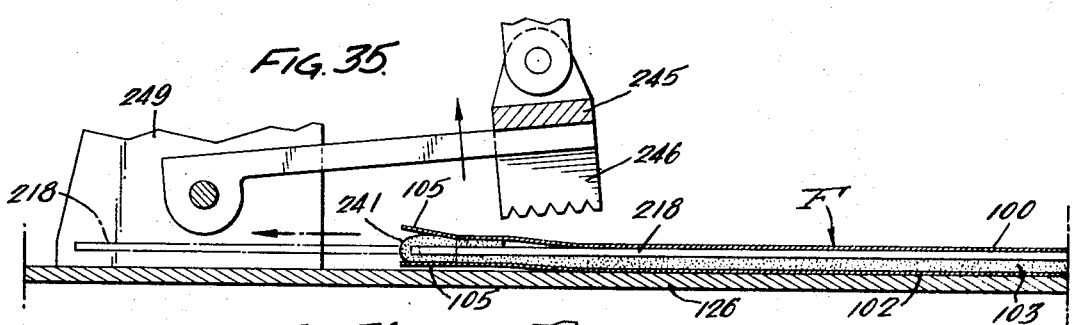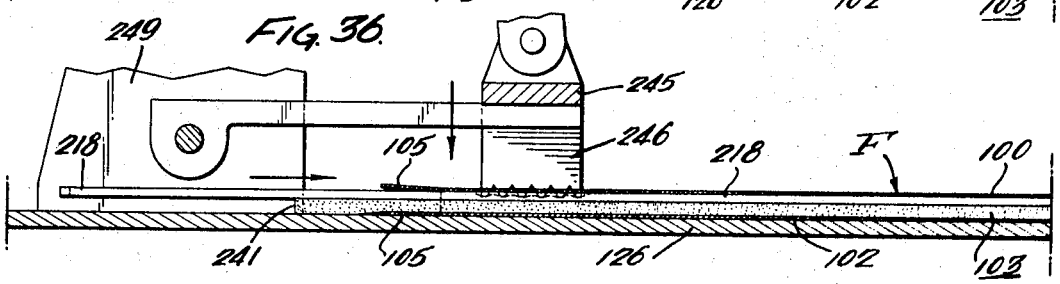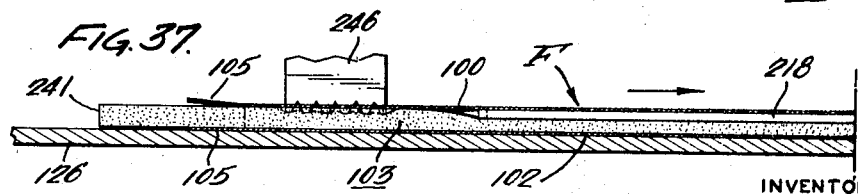

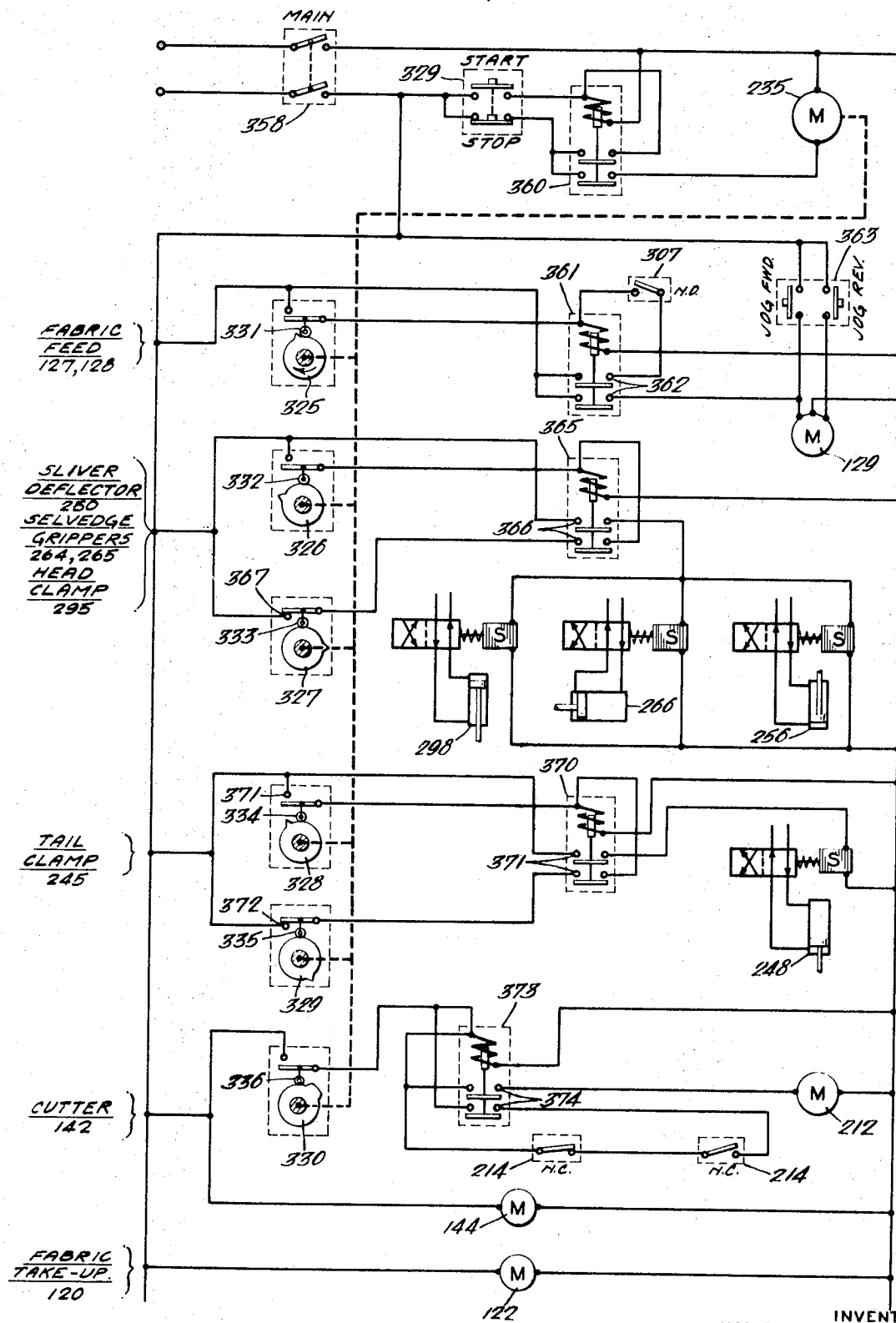

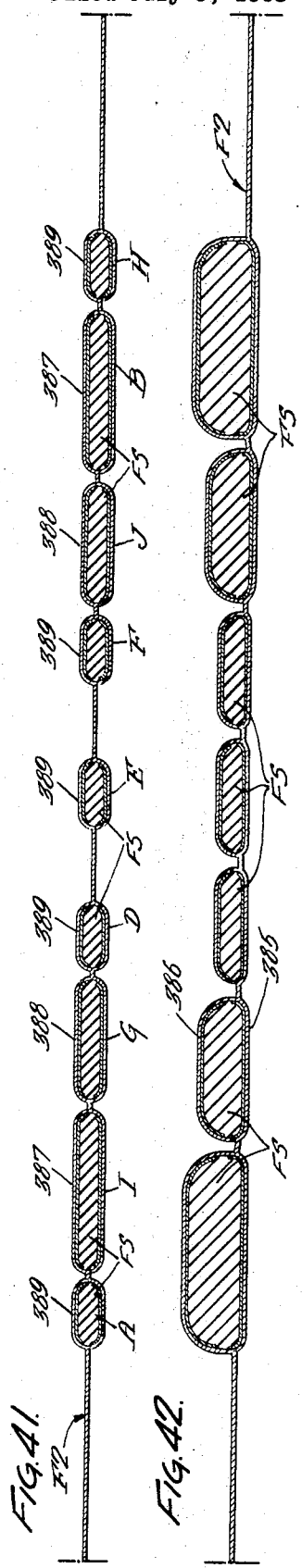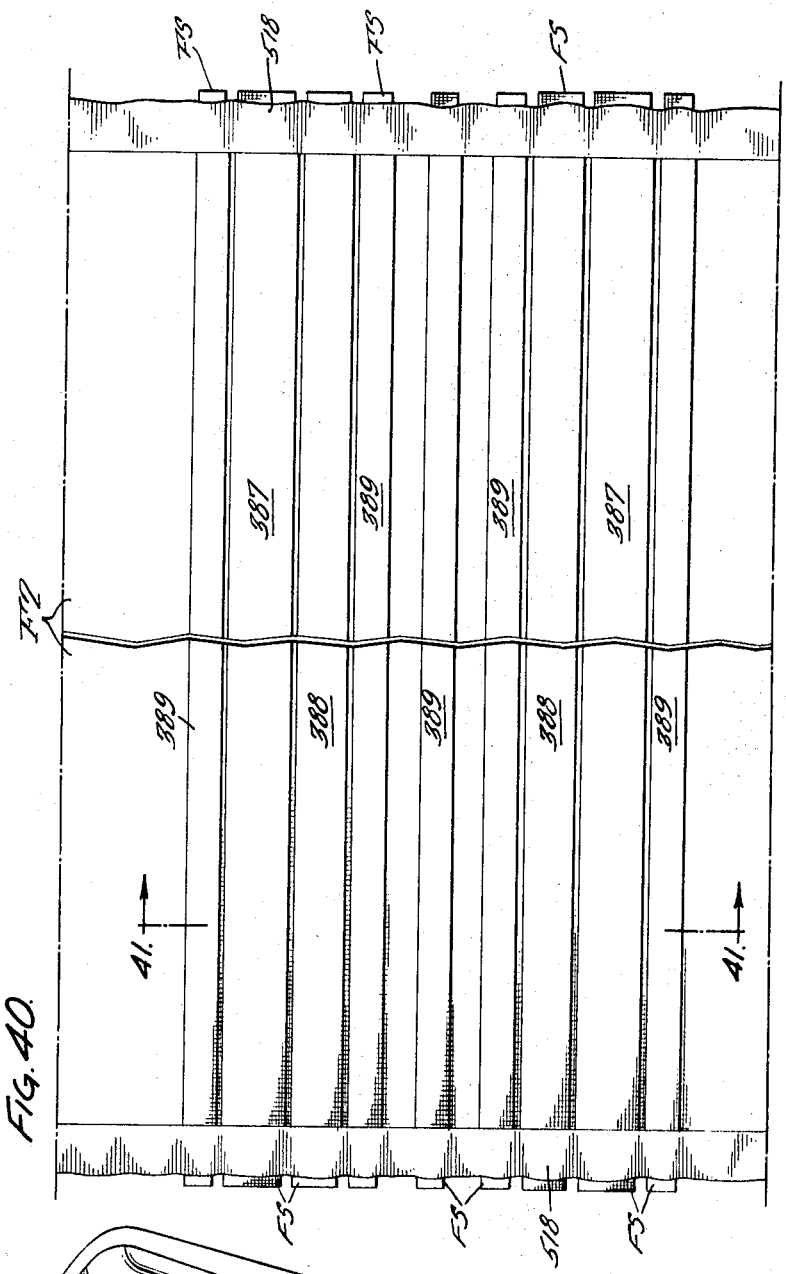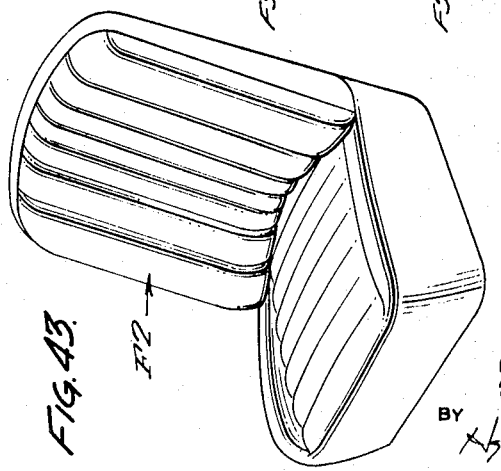

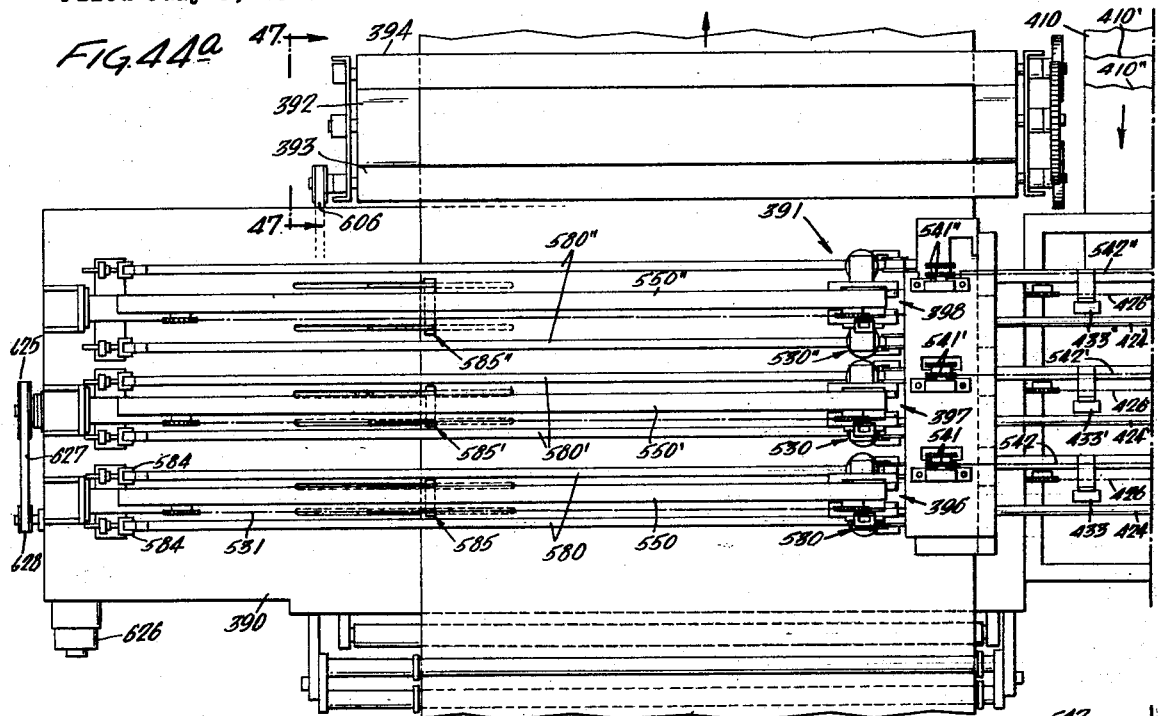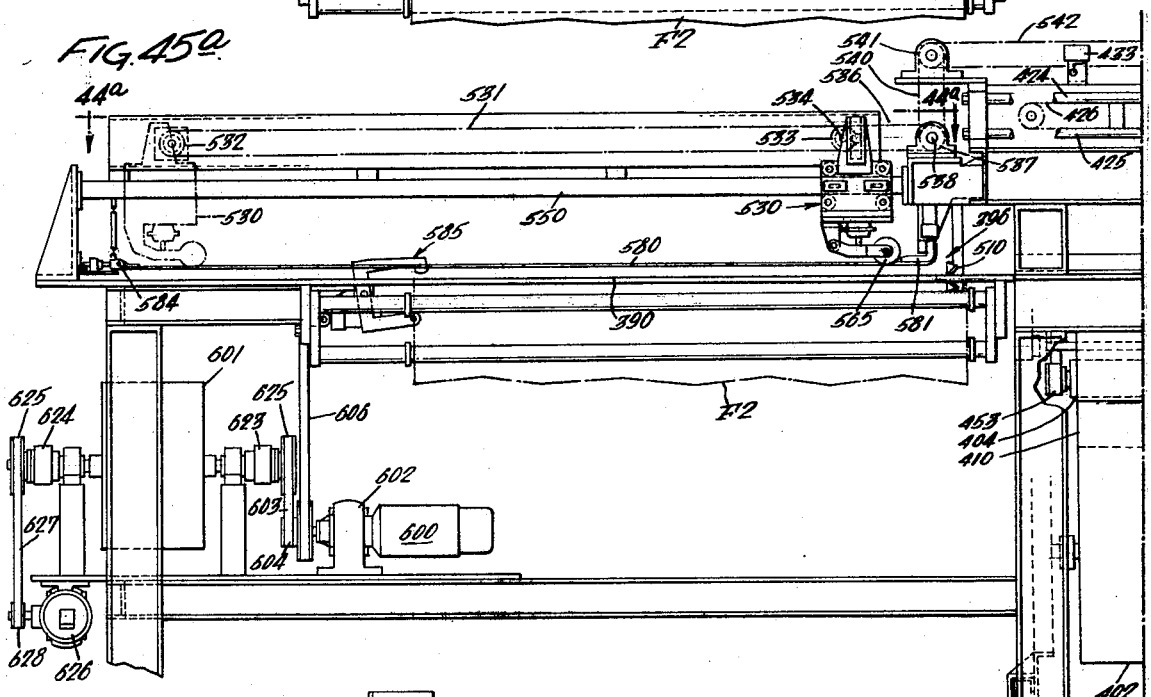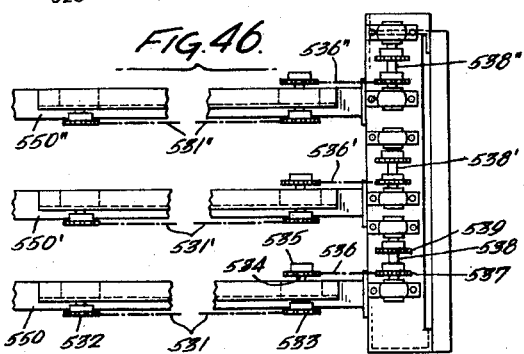

April 27, 1971 H. W. GROCE ET AL 3,576,704
PLEAT STUFFED UPHOLSTERY FABRIC
Filed July 3, 1968 26 Sheets-Sheet 16

INVENTORS:
HOMER W. GROCE
ARTHUR R. TEAGUE
WILLIAM A. WARNOCK
BY
ATTY.

INVENTORS:
HOMER W. GROCE
ARTHUR R. TEAGUE
WILLIAM A. WARNOCK
BY
ATTY.

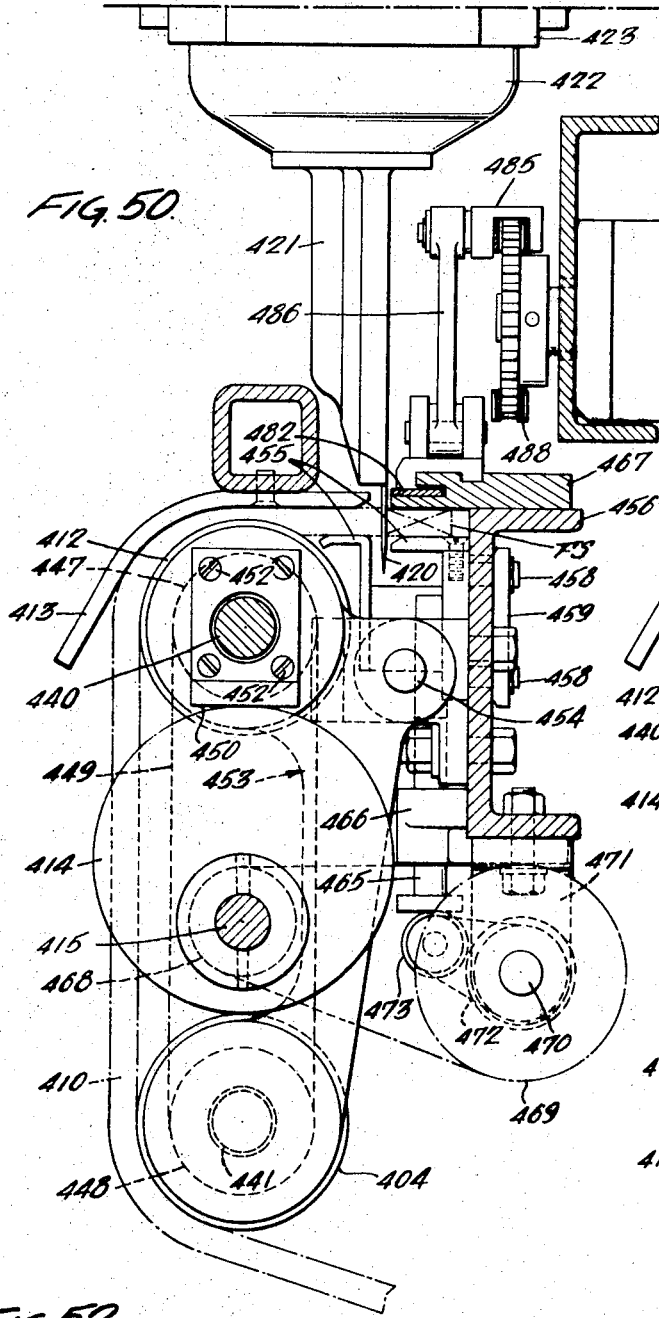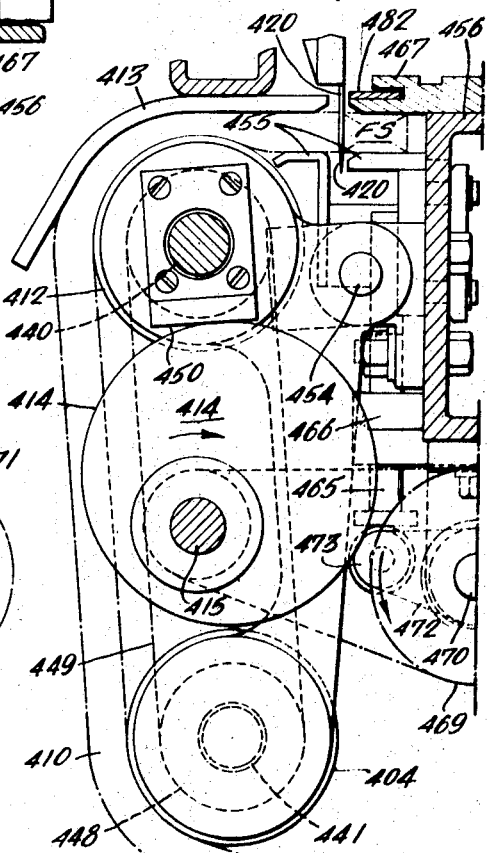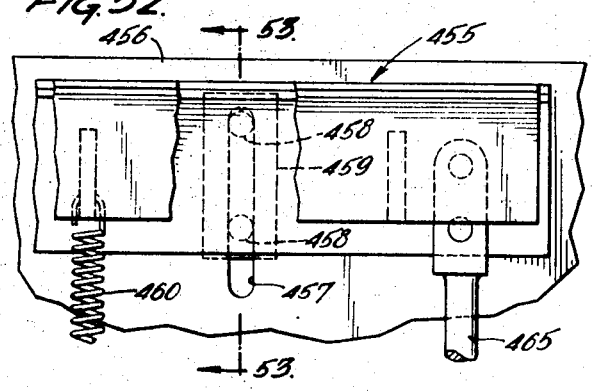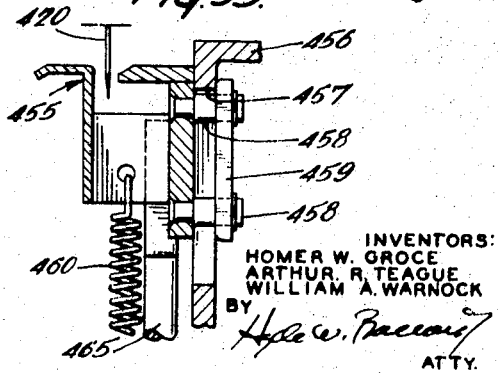

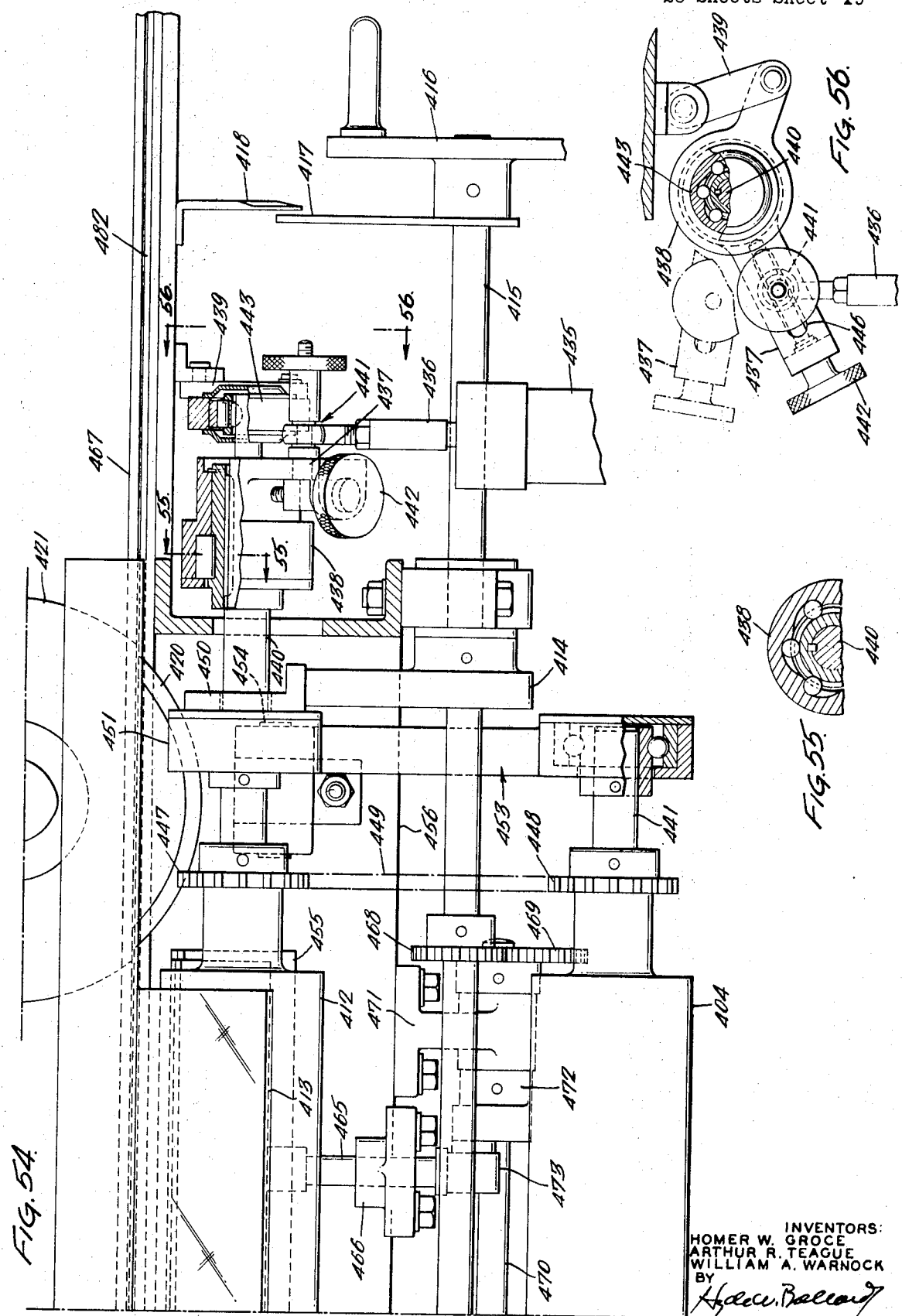

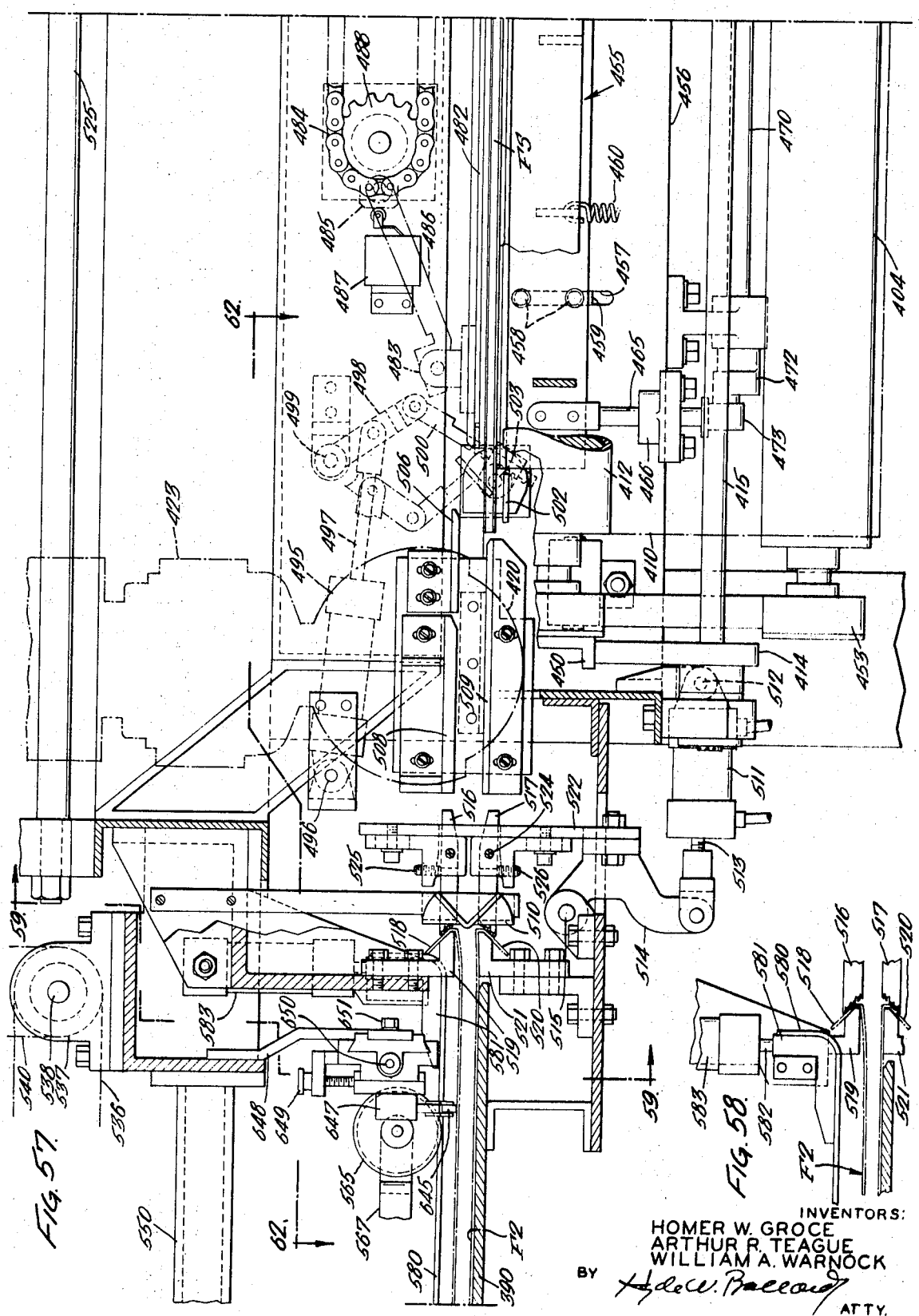

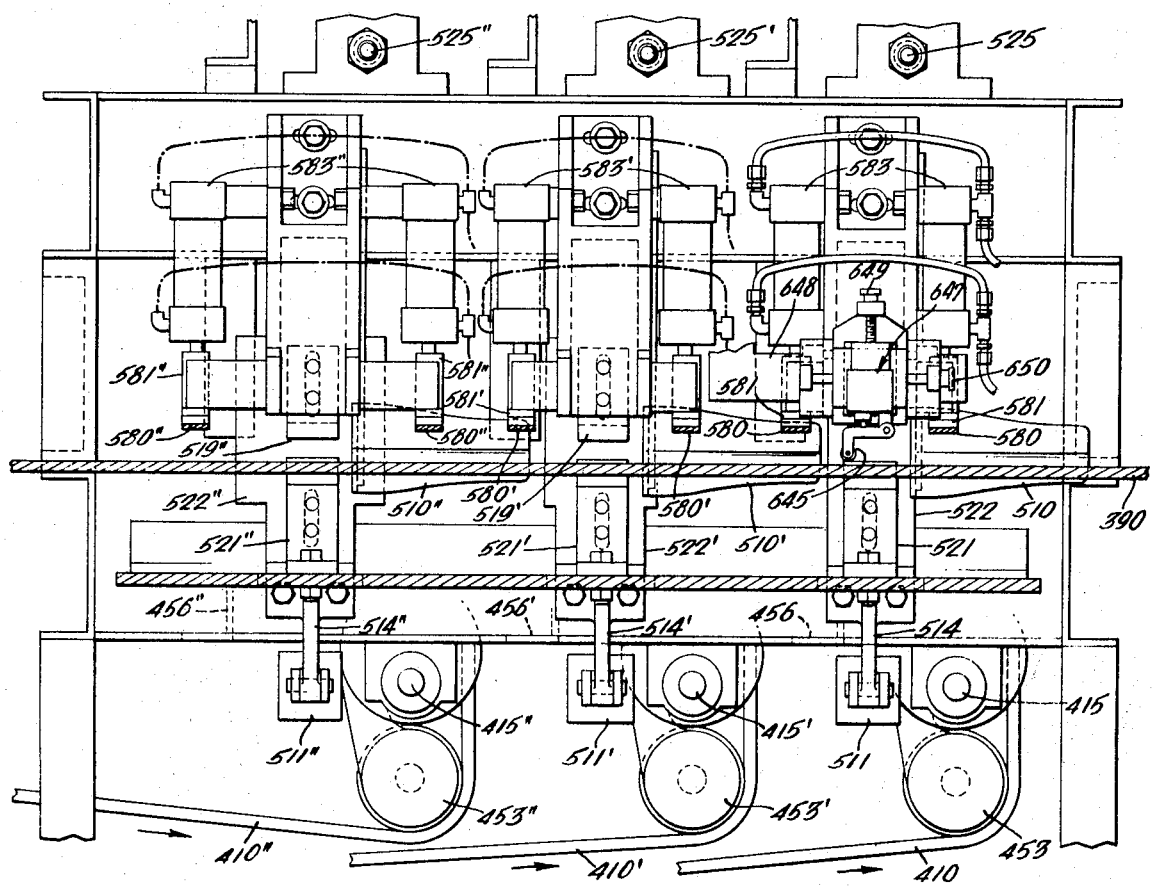
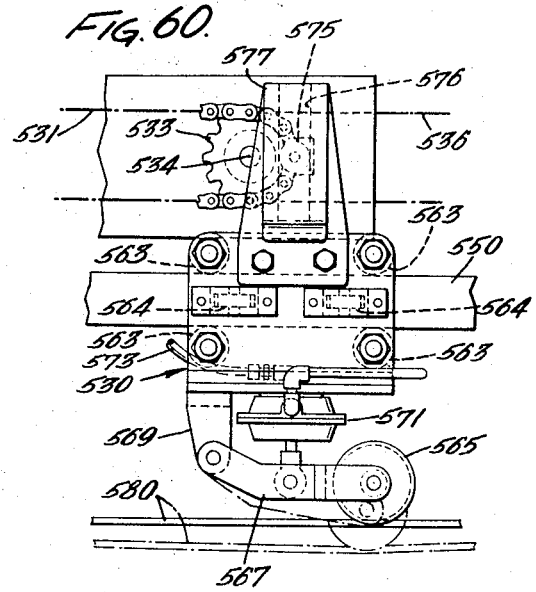
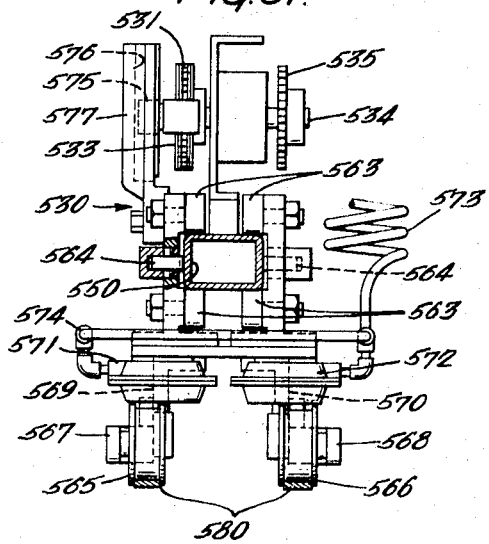

INVENTORS:
HOMER W. GROCE
ARTHUR R. TEAGUE
WILLIAM A. WARNOCK
BY Hyde W. Ballard
ATTY.

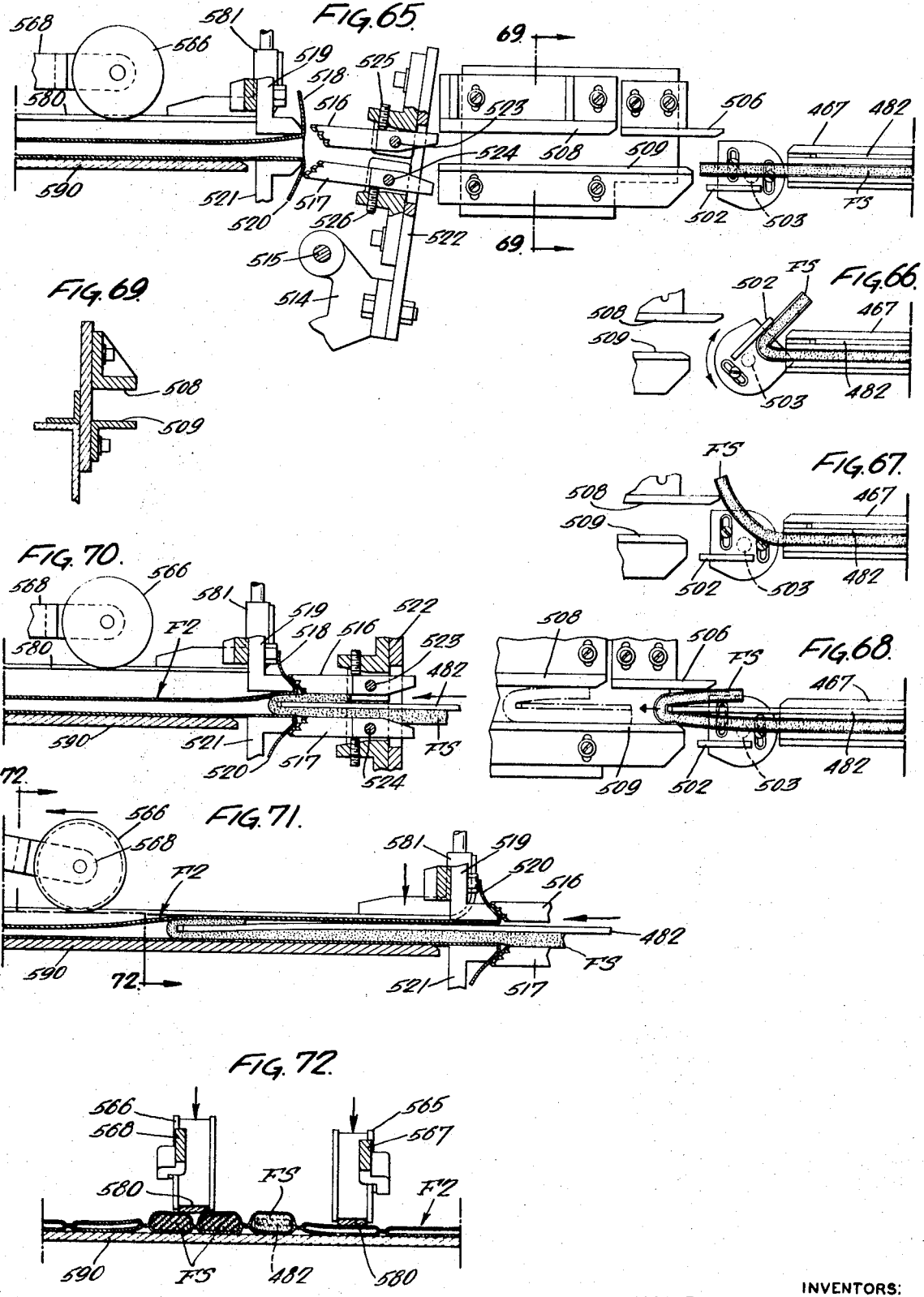

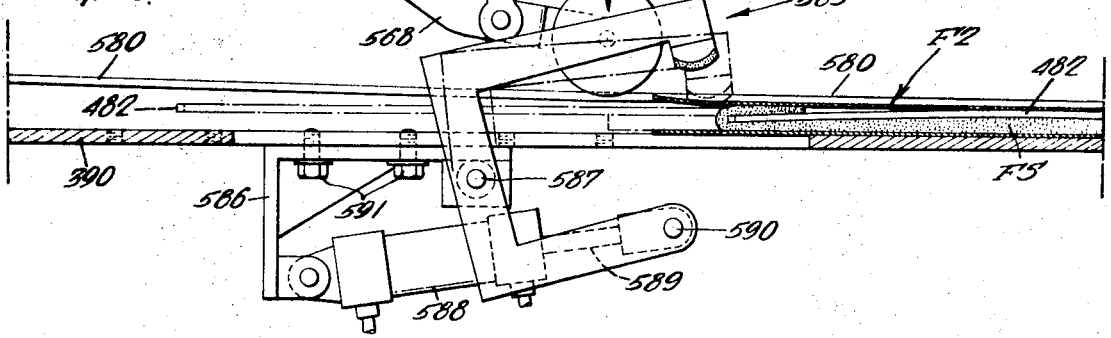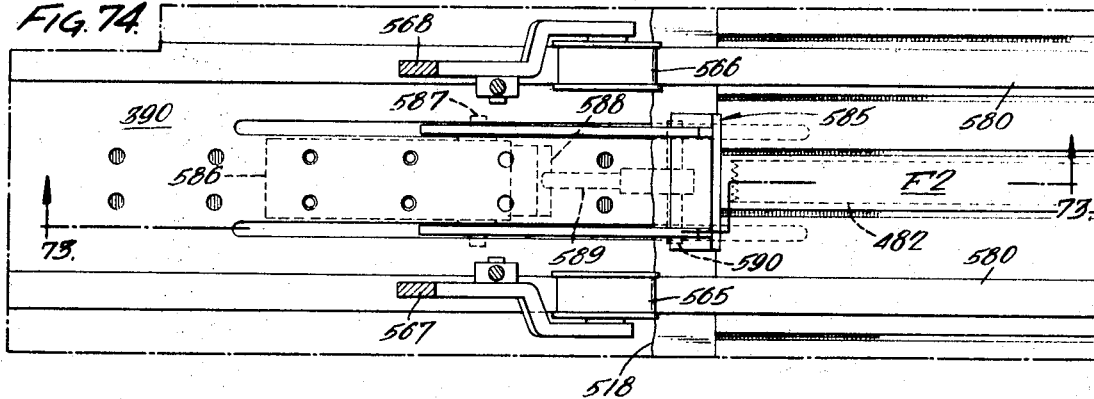

April 27, 1971  H. W. GROCE ET AL  3,576,704
PLEAT STUFFED UPHOLSTERY FABRIC
Filed July 3, 1968  26 Sheets-Sheet 25
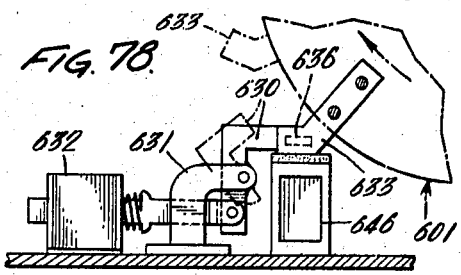
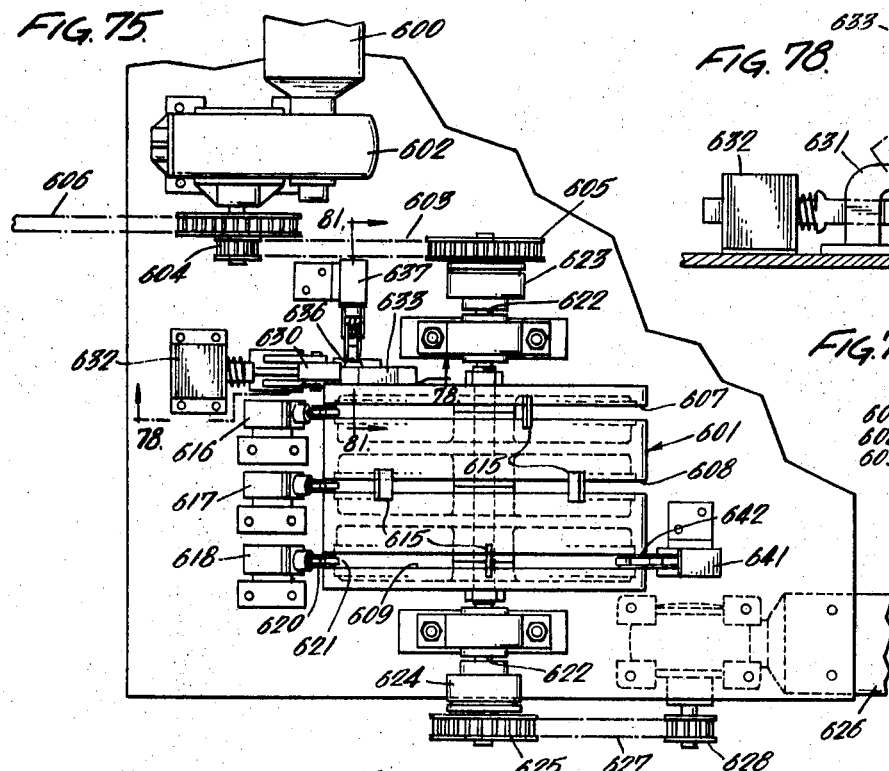
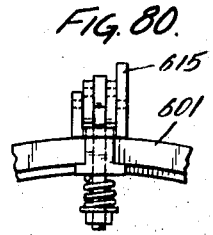
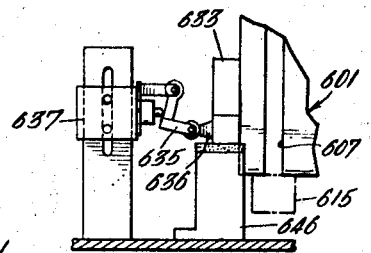
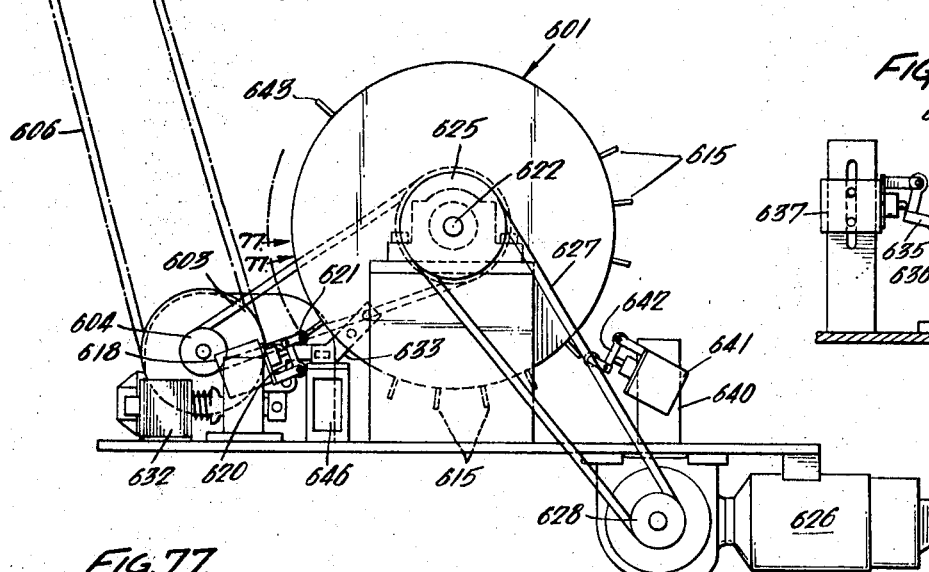
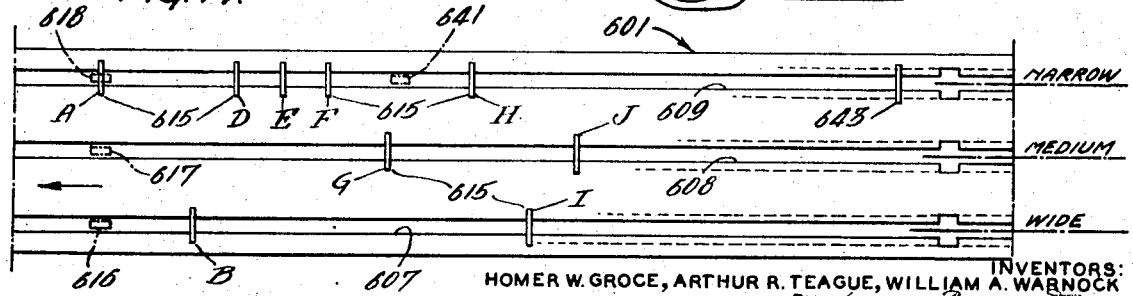
INVENTORS:
HOMER W. GROCE, ARTHUR R. TEAGUE, WILLIAM A. WARNOCK
BY
ATTY.

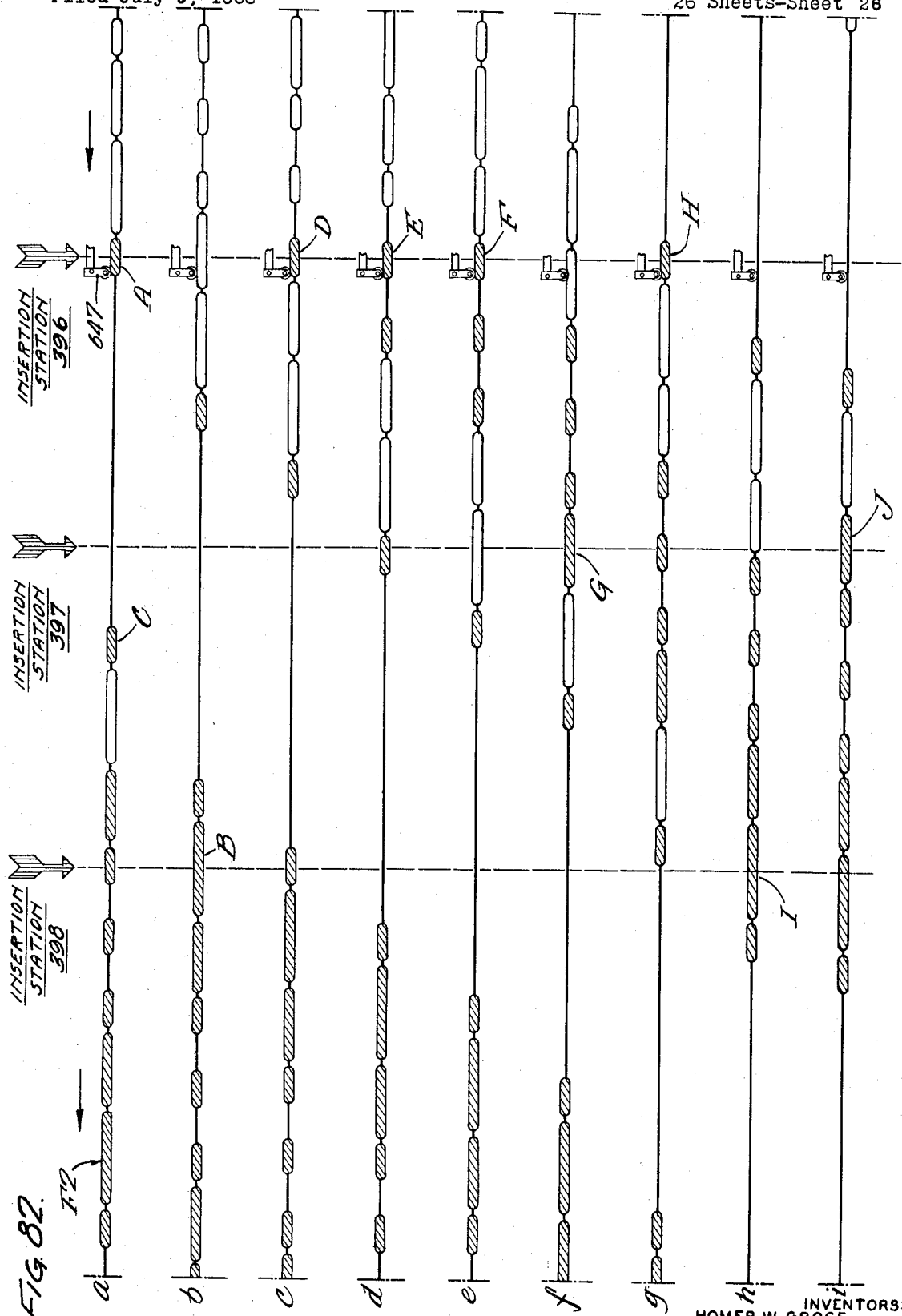

United States Patent Office 3,576,704
Patented Apr. 27, 1971

3,576,704
PLEAT STUFFED UPHOLSTERY FABRIC
Homer W. Groce, Lyman, S.C., Arthur R. Teague, Charlotte, N.C., and William A. Warnock, Lyman, S.C., assignors to Burlington Industries, Inc., Greensboro, N.C.
Filed July 3, 1968, Ser. No. 742,460
Int. Cl. A47c 7/02; B32b 3/00; B65b 43/00
U.S. Cl. 161—120                                1 Claim

ABSTRACT OF THE DISCLOSURE

A stuffed pleated upholstery fabric including an upper fabric and an interwoven lower fabric forming pleats filled with elastomeric material having a protective layer on each side thereof. At least one of the fabrics may include heat shrinkable thermoplastic yarns therein for shaping purposes.

The present invention represents a considerable advance in the art and improvement over the pleat stuffing apparatus and methods described in Hall and Solomon 3,124,918 and Fahringer 3,299,443. The apparatus described and claimed herein has two embodiments, the first being one in which the foam rubber-like filler strips are cut from a roll immediately prior to insertion in the pleat. This has been found to represent a distinct advance over the Fahringer feed in which pre-cut filling strips were manually placed in a storage reservoir. In addition, the present invention contemplates a single thickness blade or rapier which pushes the stuffing into the pleat or pocket as distinguished from pulling the stuffing through the pocket from the far edge by means of a bifurcated blade or sword.

We provide for the continuous filling in a single operation of multi-size pleats in a double fabric of the type described in the Hall et al. and Fahringer patents by means of a multi-head machine having rapiers of different widths. The stuffing material or foam rubber is fed to three stations from different rolls and, preferably, the material from which these rolls is formed is of different thickness. By using travelling circular knives, the width of each stuffing strip can be accurately determined so that in accordance with a predetermined program, any one of the selected stuffing thickness sheets may be cut at a predetermined width for insertion into a suitable pleat as the fabric advances across a table.

A primary purpose in providing pleats of varying widths and thicknesses is to produce a channel-like back material for chairs and any type of furniture but including particularly the backs and also seat cushions of automobiles. It has been found that a contoured back and cushion is desirable both from a safety and physiological standpoint. Obviously, however, the invention can be employed to provide contoured or textured upholstery fabric for many other purposes.

Figure 38:
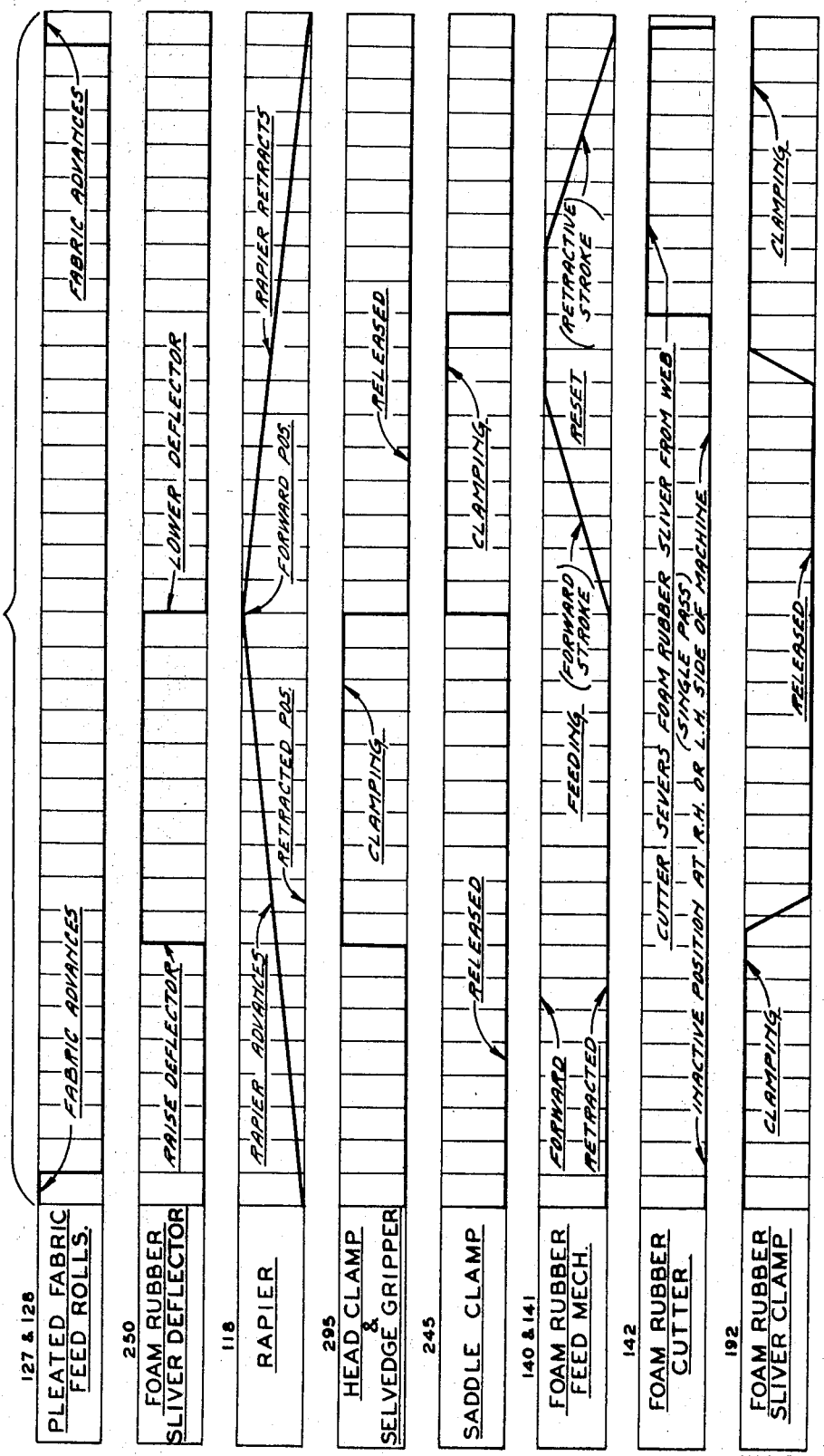

Referring now more particularly to the drawings, in which
FIG. 1 is a top view of a stuffed uniform pleat upholstery fabric,
FIG. 2 is a section as seen at 2—2 of FIG. 1,
FIG. 3 is a transverse section as seen at 3—3 of FIG 1,
FIG. 4 is a perspective showing one of the laminated filler strips just after being cut from a supply roll,
FIG. 5 is a section as seen at 5—5 of FIG. 4,
FIG. 6 is a top view of the pleat stuffing machine showing the relative locations of the stuffing supply roll, the stuffing table, and the travelling rotary knife for the stuffing strips,
FIG. 7 is a front view of the machine of FIG. 6,
FIG. 8 is a left side view of the machine of FIGS. 6 and 7,
FIG. 9 is a right side view of the machine of FIGS. 6 and 7,
FIG. 10 is an enlarged section as seen at 10—10 of FIG. 6,
FIG. 11 is an enlarged detail, partly sectioned as seen at 11—11 of FIG. 10,
FIG. 12 is a fragmentary detail as seen at 12—12 of FIG. 10,
FIG. 13 is a perspective of the single rapier used in the machine of FIGS. 6–9,
FIG. 14 is an enlarged section as seen at 14—14 of FIG 6,
FIG. 15 is a schematic series of sectional details showing progressively the clamping and feeding means for the sheet of stuffing material,
FIG. 16 is an enlarged fragmentary view as seen at 16—16 of FIG. 14,
FIG. 17 is an enlarged fragmentary view as seen at 17—17 of FIG. 14,
FIG. 18 is a fragmentary sectional detail as seen at 18—18 of FIG. 17,
FIG. 19 is an enlarged detail of the rapier and knife actuating mechanism corresponding to the right hand portion of the structure shown in FIG. 7,
FIG. 20 is a timing diagram of the actuating cams which would be seen individually as a section taken at 20—20 of FIG. 19,
FIG. 21 is a schematic top view of the drive mechanisms as would be seen generally at 21—21 of FIG. 19,
FIG. 22 is an enlarged detail showing the top view of the stuffing station,
FIG. 23 is a perspective showing a guide or opener for the fabric selvedge,
FIG. 24 is a sectional detail as seen at 24—24 of FIG. 22,
FIG. 25 is a sectional detail as seen at 25—25 of FIG 24,
FIG. 26 is an enlarged view of a portion of the showing of FIG. 22 at the mouth of the pleat next to be filled,
FIG. 27 is a fragmentary sectional detail as seen at 27—27 of FIG. 26,
FIG. 28 is a fragmentary sectional detail as seen at 28—28 of FIG. 26,
FIG. 29 is a fragmentary sectional detail as seen at 29—29 of FIG. 27,
FIG. 30 is a perspective of the trailing selvedge guide shown in FIG. 26,
FIG. 31 is an enlarged fragmentary detail showing the manner in which the flipper places the leading edge of a filling strip in front of the rapier nose,
FIG. 32 is a sectional detail as seen at 32—32 of FIG. 31,
FIG. 33 shows the rapier advancing to introduce the stuffing strip into a pleat,
FIG. 34 shows the rapier progressively advancing from the position of FIG. 33,
FIG. 35 shows the rapier and stuffing strip just prior to emerging from the opposite selvedge of the fabric and the tail clamp in raised position,
FIG. 36 shows the rapier in a fully advanced position and with the tail clamp actuated to secure the fabric on each side of the pleat being stuffed,
FIG. 37 shows the rapier withdrawing and the tail clamp still actuated to retain the stuffing in the pleat,
FIG. 38 is a cycle diagram for the various components of the machine,
FIG. 39 is a wiring diagram of the machine of FIGS. 6–9, FIG. 40 is a top view of a variable width stuffed and filled pleated fabric, FIG. 41 is a section as seen at 41—41 of FIG. 40, FIG. 42 is a section of a variable width and variable thickness stuffed fabric after heat treating to provide a flat back, FIG. 43 is a perspective of an automobile seat showing the contoured or bucket configuration achieved by employing the fabric of FIG. 42, FIG. 44a is a view of the left hand portion of an improved multi-station stuffing machine as seen generally at 44a—44a of FIG. 45a.

Figure 44B:
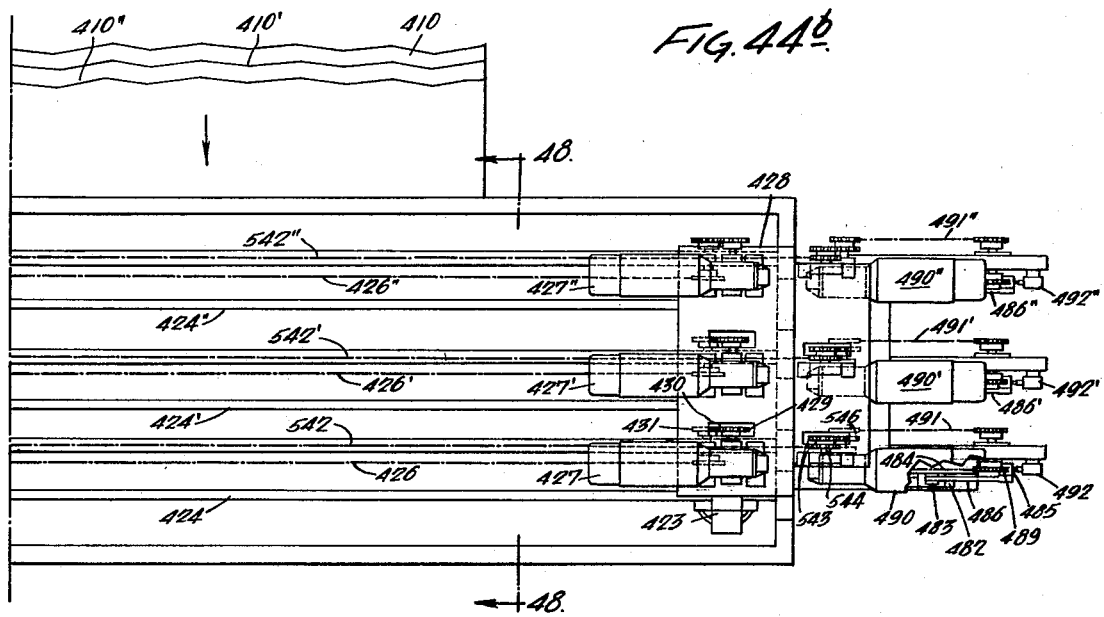
Figure 45B:
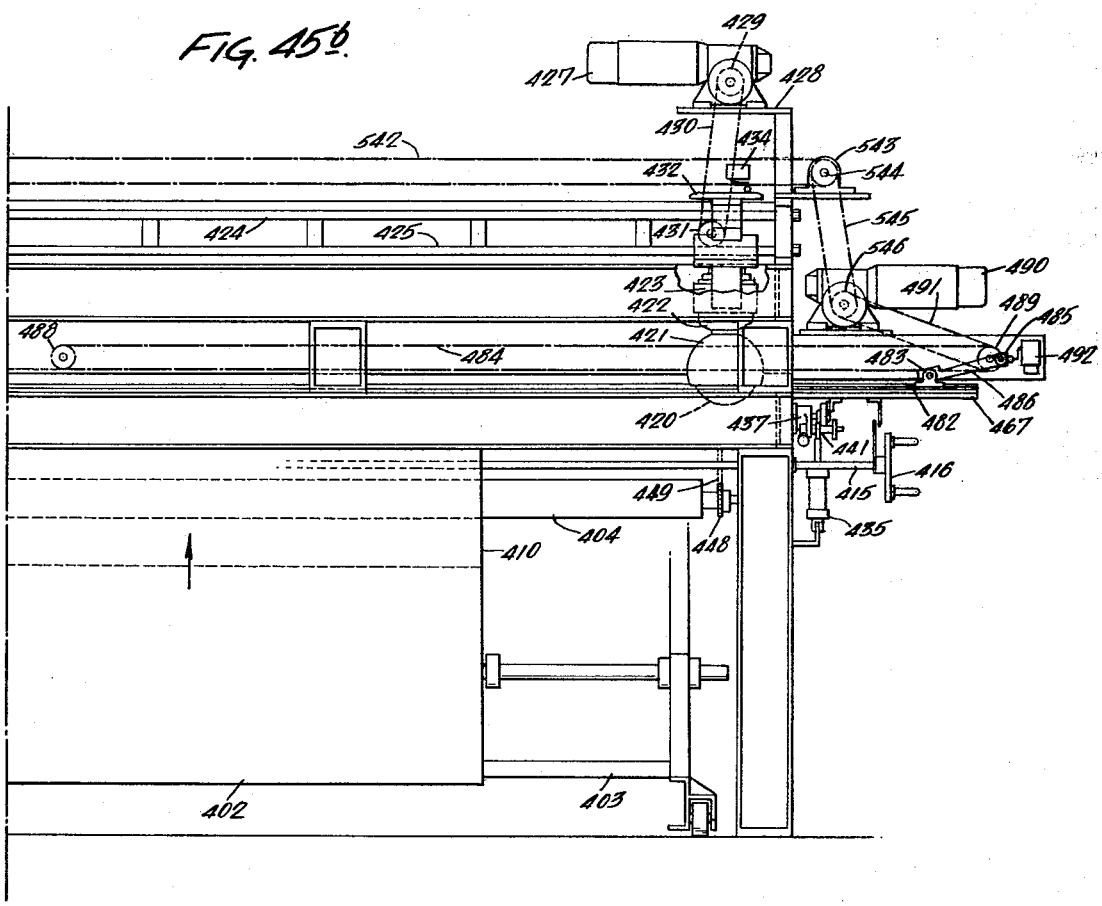
Figure 48:
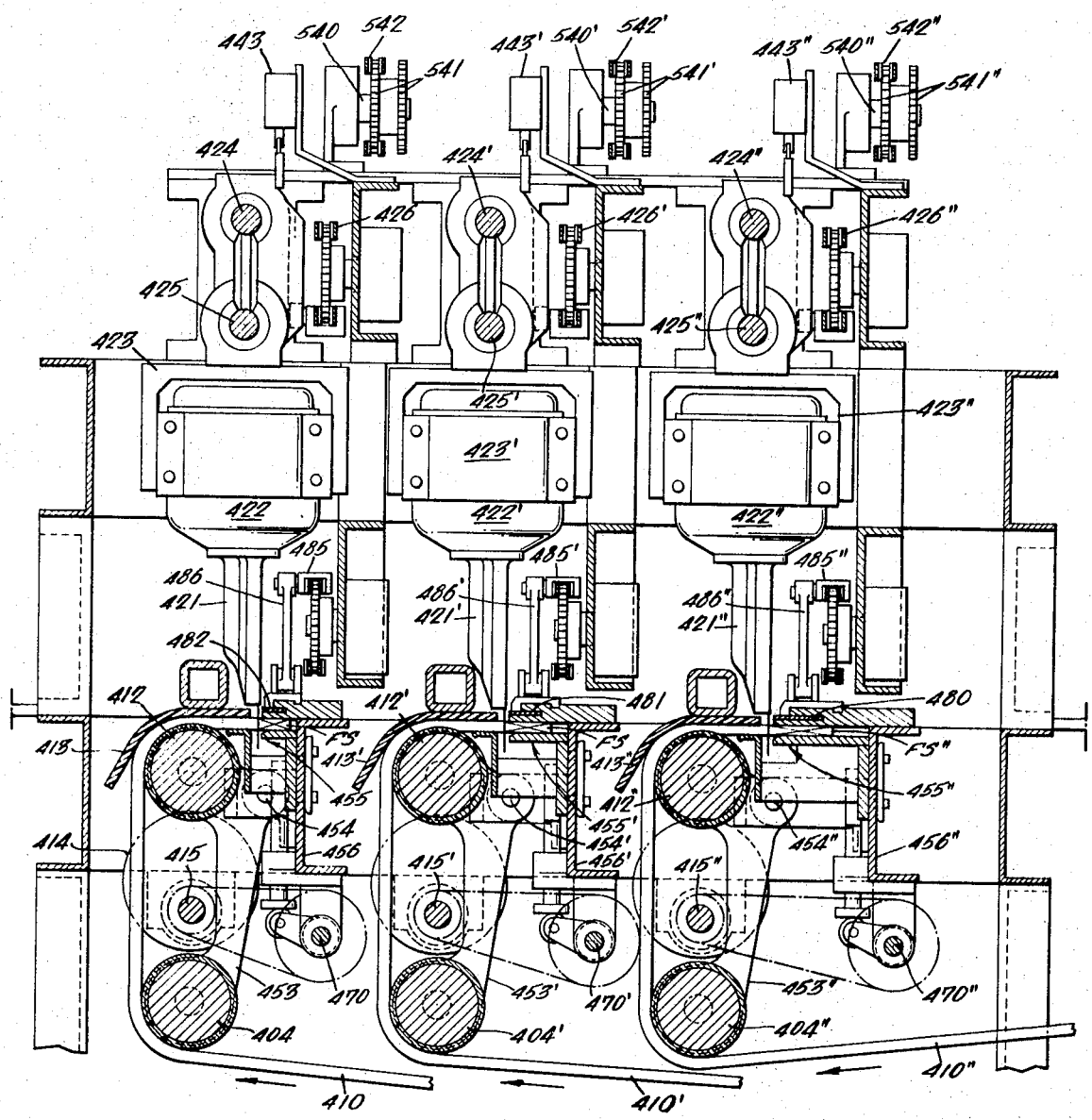
Figure 49:
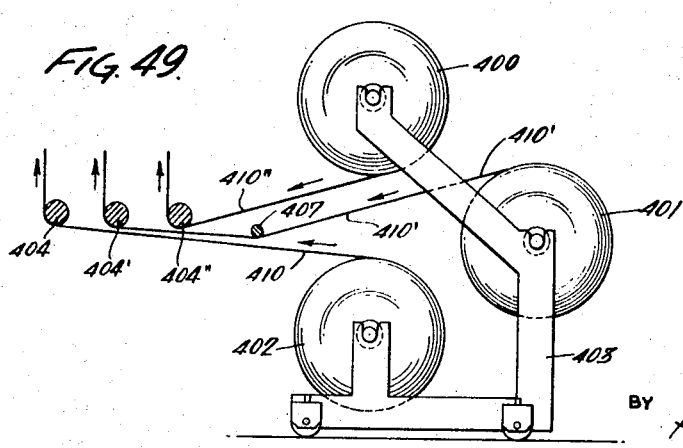
Figure 62:
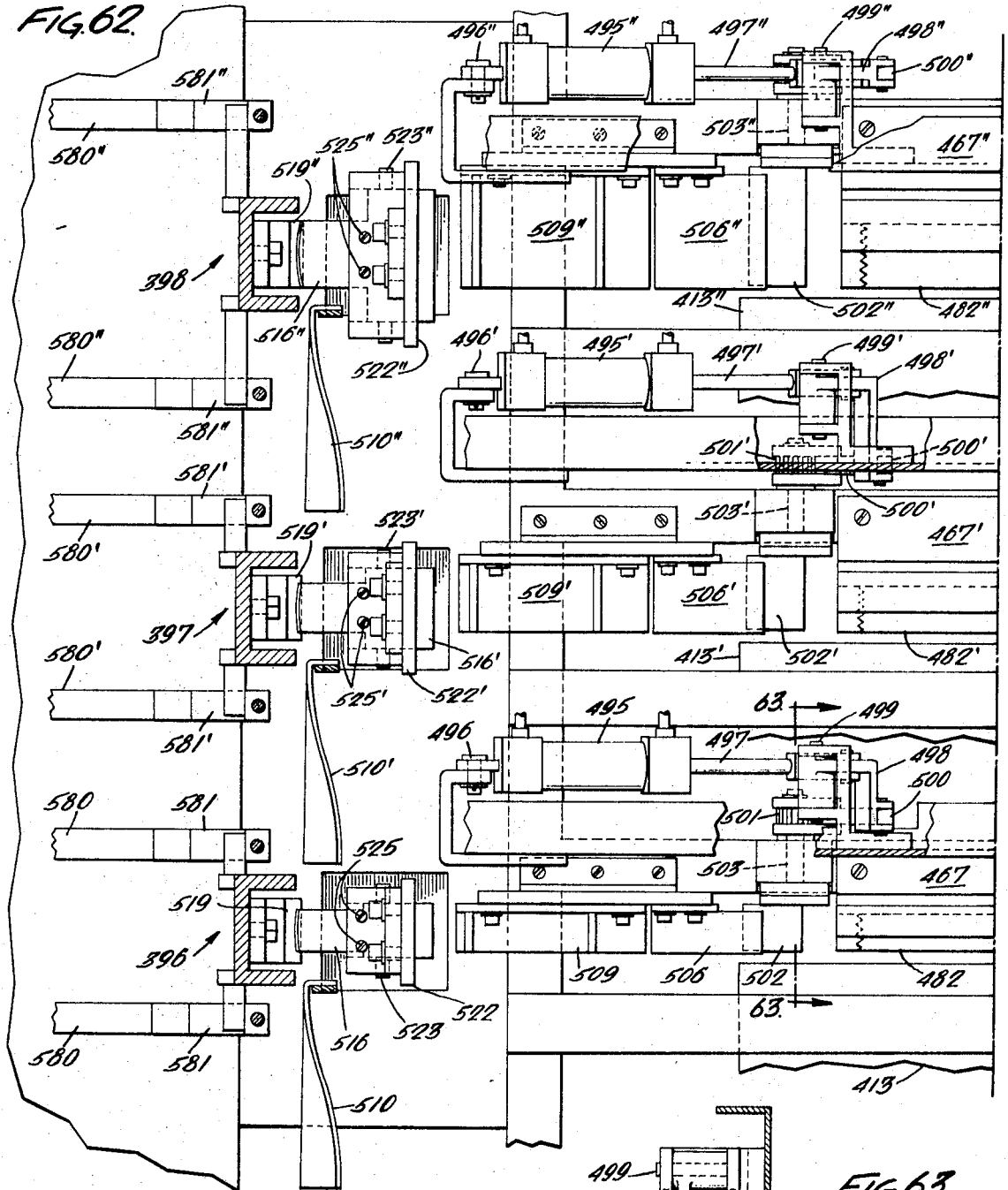
Figure 64:
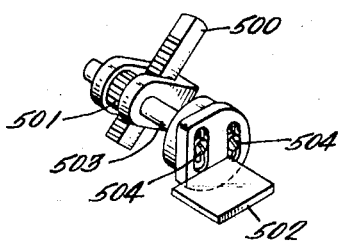
Figure 63:
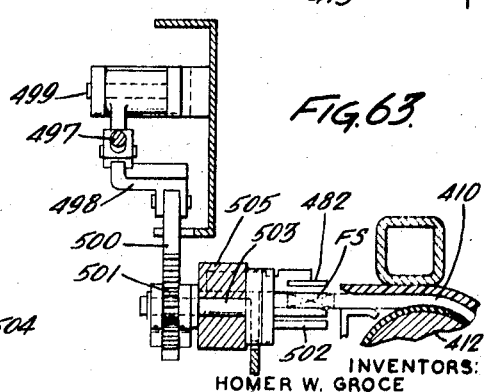

FIG. 44b is the right had continuation of FIG. 44a showing the multi-station cutting apparatus for the stuffing strips, FIG. 45a is a front view of the structure of FIG. 44a, FIG. 45b is a front view of the structure of FIG. 44b, FIG. 46 is an enlarged fragmentary detail of the roller clamp drive, FIG. 47 is a sectional detail of the fabric take-up roll, FIG. 48 is a enlarged section as seen at 48—48 of FIG. 44b, FIG. 49 is a fragmentary detail showing the stuffing roller stand and lace-up, FIG. 50 is an enlarged sectional detail of one of the stuffing sheet adjustable feeds as shown in FIG. 48 with the parts adjusted for a thin sheet, FIG. 51 is a view similar to FIG. 50 but with the parts adjusted for a thick sheet, FIG. 52 is a fragmentary detail showing the spring loaded backing plate or anvil for the sheet, FIG. 53 is a fragmentary sectional detail as seen at 53—53 of FIG. 52, FIG. 54 is an enlarged sectional detail of the right hand portion of FIG. 45b, FIG. 55 is an enlarged fragmentary section as seen at 55—55 of FIG. 54, FIG. 56 is an enlarged sectional detail as seen at 56—56 of FIG. 54, FIG. 57 is an enlarged section of a portion of the multistation pleat stuffing machine showing the operation of the selvedge opener and its associated grippers, FIG. 58 is an enlarged fragmentary sectional detail of the fabric selvedge at the inserting station, FIG. 59 is a section as seen at 59—59 of FIG. 57, FIG. 60 is an enlarged fragmentary detail of one of the roller clamps for holding the fabric in place in advance of the rapier, FIG. 61 is an end view of the structure of FIG. 60, FIG. 62 is an enlarged sectional detail as seen at 62—62 of FIG. 57, FIG. 63 is an enlarged sectional detail as seen at 63—63 of FIG. 62, FIG. 64 is a perspective detail of a portion of the structure of FIG. 63, FIG. 65 is an enlarged detail of the selvedge grippers as shown in FIGS. 57 and 58, FIGS. 66–68 show progressive positions of the apparatus of FIG. 65 and the manner in which the individual pleat stuffer strips are picked up by the rapier, FIG. 69 is a fragmentary sectional detail as seen at 69—69 of FIG. 65, FIG. 70 is a view of the structure of FIG. 65 with the parts in an advanced position, FIG. 71 is a view similar to the left hand portion of FIG. 70 but with the rapier further advanced, FIG. 72 is a sectional detail as seen at 72—72 of FIG. 71, FIG. 73 is a section showing one of the anti-buckling rollers and the fabric hold down tail clamps at the far selvedge as seen at 73—73 of FIG. 74, FIG. 74 is a top view of the unsectioned structure of FIG. 73, FIG. 75 is a fragmentary top view of the drum programmer, FIG. 76 is an end view of the structure of FIG. 75, FIG. 77 is a flat pattern of the programming drum periphery showing the relative location of the actuating lugs, FIG. 78 is an enlarged sectional detail as seen at 78—78 of FIG. 75, FIG. 79 is an enlarged fragmentary detail showing one of the programming lugs secured to the drum, FIG. 80 is a section as seen at 80—80 of FIG. 79, FIG. 81 is an enlarged sectional detail as seen at 81—81 of FIG. 75, and FIG. 82 is a diagrammatic showing the pleat stuffing sequence in the multi-head machine of the present invention.

FABRIC FEED AND TAKEUP

Referring now more particularly to the drawings, a stuffed pleated upholstery fabric of the type capable of being produced on the machine shown in FIGS. 1–3 comprises an upper woven fabric 100 interwoven at 101 with a second fabric 102. As is well known in the art and shown in the Hall and Fahringer patents above, either or both of the fabrics 100 or 102 have thermoplastic heat shrinkable yarns so that after weaving in a flat form and filling with the stuffing material 103 the pockets are more particularly formed in the desired shape which in turn may be controlled to a limited extent by the type of yarns and the weave. It is to be understood, however, that in fabric of this sort the final configuration of the pleats or pockets will be approximately uniform. The fabric also has selvedge areas 104 and 105 which extend beyond the interwoven connection which forms the juncture between adjacent pleats. For rather obvious reasons the dual type fabric described above must be woven prior to stuffing and the unconnected selvedges 104 and 105 are utilized for the stuffing operation as will be shown later.

FIG. 4 shows one of the stuffing strips 103 after it has been cut from a large supply roll 108 (FIGS. 6–9). The resilient core or center 109 of the strip 103 is preferably of a foam or sponge material for example one that is suitably elastomeric such as natural or synthetic rubber. A woven or knitted material 110 and 111 is adhered to the foam to prevent fraying and disintegration when the shape of the seat back or cushion or other item is cut out of the finished stuffed fabric. The preferably woven protective backings 110 and 111 are shown clearly in FIGS. 3 and 4 and prevent damage to the foam from the rapier. This construction has been found to provide a far superior stuffing or filling material than used heretofore.

Referring now to FIGS. 6 and 7 the unstuffed fabric is fed from a supply roll 115 which is journaled on suitable conical trunnions 116 and 117. In order to supply proper tension, the unstuffed fabric feeds around a pivoted tension device 118 which can be seen more clearly in FIG. 8. After completing the stuffing operation, the fabirc F is wound on a power driven takeup roller 120, which is journaled in a stand 121 and driven by means of a motor and reduction drive 122 through chain 123. The stuffing operation is performed at a station 125, which is substantially at the center of a table or platform 126. The driven takeup rollers 127 and 128 are accurately controlled by a motor 129, gear reduction 130, and chain 131, in such a way that proper registery of the next pleat at the stuffing station 125 is assured.

STUFFING FEED AND CUTTING

The pleat filling or stuffing material from which strips 103 are cut is fed from supply roll 108, which is supported on a stand 135 and rests on journaled rollers 136, 136. The material from supply roll 108 feeds in a substantially horizontal direction between a pair of lateral guide pleats or shoes 138 and 139. From thence it passes between the jaws 140 and 141 of a clamp which oscillates to grasp the leading edge of the sheet material fed from roll 108 and to advance the edge into the path of a circular knife 142 as shown in FIGS. 10 and 15. The knife cutter is provided with a suitable truncated guard 143 (FIGS. 7, 9, 11 and 19) as shown clearly in FIG. 10. The circular knife or blade 142 extends substantially below the cutting table and the lower edge of the guard to insure complete separation of each strip regardless of the material thickness range. The mechanism for actuating the knife blade 143 and its motor 144 will be described more fully hereinafter.

Referring to FIG. 9 and more specifically with respect to FIGS. 11, 14 and 15, the actuating and control mechanism for the stuffing strips will be described. From its support on rollers 136, 136 the uncut sheet of stuffing material S passes between adjustable guides 138 and 139 over table 150. The forward edge of the sheet S is engaged between the upper and lower jaws 140 and 141 of the oscillating clamp assembly. The upper jaw 140 is actually the lower face of an I-beam 151 supported on a carriage 152 at each end by means of connecting links 153 and 154. The carriage 152 is, in turn, mounted on a plurality of links 155, 155 (FIG. 14). Carriage 152 slides on horizontal ways 156, 157 under control of an adjustable drive link 160. Relative movement between upper and lower jaws 140 and 141 is controlled by means of a long link 161 pivotally connected to the short end of a yoke 162. The opposite end of yoke 162 is provided with a pair of cam followers 165 and 166 which simultaneously run on a cam 167 journaled on camshaft 170 (FIG. 17).

The adjustable drive links 160 are connected to crank arms 175, 175 keyed to a rockshaft 176. This shaft is, in turn, oscillated through a limited but adjustable arc by means of a cam 177 on shaft 178. An oscillating control arm 180 journaled on trunnion 181 carries a slotted element 182. A cam follower 183 on a backward extension of arm 180 is actuated by cam 177. This, in turn, regulates the amplitude of oscillation of shaft 176 due to the angular adjustment of member 182 controlled by a thumbnut 184 which turns element 182 on its pivot 185.

Referring now to FIG. 15 the stuffing sheet S is clamped on carriage 152 between upper jaw 140 and lower jaw 141. In this condition the carriage 152 advances to withdraw a controlled amount of fabric from supply roll 108 and to position the previously cut edge of the sheet between the jaws of the cutting clamp. The knife 142 reciprocates horizontally in a groove between the fixed upper jaws 190 and 191. The bottom clamp jaw or anvil 192 reciprocates vertically under the control of a cam follower 193 journaled on a carriage 194 which pivots on shaft 195. Carriage 194 is connected to shaft 195 by rocker arms 196, 196. As the stuffing sheet is advanced to the bottom jaw 141 shown in FIG. 15, the anvil 192 is raised to the position at the top in FIG. 15 whereupon the circular knife 142 is advanced to sever a predetermined width of stuffer material from the sheet S.

Referring now to FIG. 10 the knife 142 is operated by the knife motor 144 which is mounted on a reciprocating carriage 200 slidable on ways 201 and 202. These ways are supported in standards 203 and 204 respectively and the carriage 200 is anchored to a chain 205. The roller chain 205 runs between sprocket 207 on jackshaft 208 and sprocket 210 keyed to driveshaft 211 connected to motor 212 and mounted in standard 213 (FIGS. 6 and 19). The movement of the knife carriage 206 is stopped at each end of its traverse by a pair of limit switches 214, one at each side of table 150 (FIG. 7). The right hand switch is adjustably mounted in its supporting bracket 215 as shown in FIG. 19. As soon as the stuffed sheet has been repositioned and clamped in cutting alignment as shown in FIG. 15, the motor 212 is started to advance the knife carriage 200 along ways 201 and 202. When the knife carriage has completed its forward traverse, the cam 216 strikes the actuating arm 217 of the switch, which in turn stops the motor 212. On the next cycle the carriage returns to its initial position making another cut. After completion of each cutting traverse, the severed stuffer strip 103 is held in position for engagement by the rapier 218 (FIG. 13).

The present machine is capable of limited adjustment in the range of 1 to 4 inches so that varying widths of stuffing may be cut from the feed roll 108 of the stuffing machine.

Referring now to FIGS. 14 and 16, the strip width adjustment referred to above will be described more specifically. Camshaft 178 carries the cam 177 which actuates the cam follower 183 and consequently oscillates the rocking lever 180. Shaft 176 is spring loaded by means of a plurality of extension springs 220 secured to a fixed post 221 at one end and at the other end to carriage beam 222 (FIG. 10) through post 223. The tension of springs 220, 220 maintains contact at all times between a cam 225 keyed to shaft 176 and cam follower 226 which is in turn carried on element 182. The effective length of the surface of cam 225 that contacts cam follower 226 is varied by loosening nut 227 and angularly displacing the center of cam follower 183 with respect to the lever 180. A suitable calibrated scale 228 is used to facilitate this adjustment. It will be understood that the higher the cam follower 226 rides on cam 225, the longer will be the stroke of carriage 155. Thumbnut 184 is turned to vary the adjustment after locknut 227 is loosened.

OPERATION OF THE RAPIER AND FLIPPER

After the proper width stuffing strip 103 has been severed by the knife 142, it is registered with one of the pleats or pockets in fabric F. The rapier 218 (FIG. 13) is positioned directly above the severed strip in a T-slot 230 as shown in FIG. 15. The trailing end of the rapier is provided with a bifurcated standard 231 which is secured in a coupling 232 of rapier chain 233. This chain is driven by a sprocket 234 which is in turn connected to the drive motor 235 through chain 236 and speed reducer 237. A pre-loaded clutch 238 is provided in the drive train to prevent damge to the machine in the event of a jam-up. With the rapier in a fully retracted position as shown in FIG. 19 a flipper assembly 240 (FIG. 26) is pneumatically operated to flip the leading end 241 of the next stuffing strip upwardly in front of the leading end 242 of the rapier. This leading end 242 is preferably provided with serrations as shown in FIG. 13 so that as the rapier advances due to clockwise rotation of sprocket 234 and idler sprocket 243, the leading end of the strip 103 is impaled upon the end 242 of the rapier as shown in FIG. 31-33. As the rapier advances to the left as shown in FIG. 34, it injects the full length of the strip 103 of the filling material completely through the pleat to be filled until it clears the far selvedge of the fabric and snaps ot a straight unfolded position as shown in FIG. 36. When the pleat has been filled and the end of the strip unfolded as shown in FIG. 36, a saddle clamp 245 having bifurcated clamp faces 246 and 247 is pivoted to securely grip the fabric F and to retain it in proper position during the withdrawal of the rapier. The clamping faces 246 and 247 are actuated by means of an air cylinder 248 mounted on a bracket assembly 249 as shown in FIG. 7. It will thus be understood that the rapier 218 pushes each stuffing strip through the pleat instead of pulling it through as was done in the Fahringer patent referred to above.

Referring now to FIGS. 14, 26, 27, 31 and 32, the flipper assembly 240 comprises a blade 250 pivotly mounted on a carriage 251 and spring biased by means of an extension spring 252 so that the blade is retained in a horizontal position by means of limit stop 253 during upward movement of the flipper head 254 which is on piston rod 255 and guided for vertical reciprocation in slide 256. On the downward stroke, blade 250 pivots on a post 257 upon contacting the end of the strip or the rapier, as the case may be, to clear the strip. The blade when partially pivoted to the clear position is shown in broken lines in FIG. 32. The flipper head 254 is actuated by means of an air cylinder 258 (FIGS. 14 and 27) secured to angle bracket 259. The timing of the various elements is important and will be described subsequently in connection with FIG. 20.

OPERATION OF THE SELVEDGE OPENER AND CLAMPS

As fabric F advances across the table as shown in FIG. 6 the near selvedge is opened to receive the rapier and stuffing strip by means of selvedge opener 260 (FIG. 23) which is mounted in advance of the filling station by means of bolts 261, 261 (FIG. 22). The angular arcuate configuration of the opener 260 guides the lower selvedge edge to the bottom and the upper arcuate opener edge guides the top selvedge to the top so that they are held firmly by means of the movable grippers or head clamps 264, 265 (FIGS. 33 and 34). These clamps are actuated by means of an air cylinder 266 (FIG. 26), which is pivotally mounted at 267 and provided with a piston rod 268 connected to an angular yoke 269 which swivels at 270. Each of the clamps 264 and 265 is mounted on its respective shaft 271 and 272 which in turn pivot in one arm of the yoke 269. The levers 273 and 274 are keyed to shafts 271 and 272 and are provided with a compression spring 275 which urges the clamps into resilient pressure contact with the stationary anvils 276 and 277. On the downstream side of the filling station the selvedges are maintained in a vertical position by means of a bifurcated selvedge guide 280 (FIG. 30), which is mounted on the table through a bracket 290. FIG. 27 illustrates the clamps in place to hold the selvedge against the anvils 276 and 277 and with the flipper ready to turn the leading edge of the strip over the end of the rapier after which the rapier will advance to carry the turned over strip end and the strip through upper and lower guides 291 and 292 respectively. After passing through the guides 291 and 292, the strip is inserted into the pleat as shown in FIG. 33 until it passes through the pleat and flattens out as shown in FIGS. 35 and 36.

HEAD CLAMPS AND FILLED PLEAT SENSOR

In order to prevent buckling of the fabric F during the filling operation, a vertically reciprocating head clamp 295 is provided which is shown in the released position in FIG. 24 and in the closed position in FIGS. 33 and 34. The clamp 295 is loosely secured to piston rod 296 by means of a yoke and bolt shown at 297, this arrangement providing limited movement of the clamp with respect to the surface of fabric F. The piston rod 296 is, in turn, actuated by means of an air cylinder 298 shown in FIG. 7.

In order to correlate the operation of the various moving parts and to insure proper registration of an empty pleat in front of the rapier, a sensing arm 300 (FIGS. 24–25) is provided with a roller 301 on spring loaded bracket 302 that is vertically adjustable in ways 303 by means of thumb screw 304 and horizontally adjustable in ways 305 by means of thumb screw 306. A suitable microswitch 307 actuated by arm 300 is carried in slide 308 and provided with electrical connections 309. The sensor assembly is securely locked in any desired adjusted position by means of nut 310 (FIG. 25) and is supported over the fabric by means of an overhanging bracket 311.

DRIVING CONNECTIONS

Referring now to FIG. 21 the main motor 235 drives through a reducer 237 and overloaded clutch 238 to output shaft 315 journaled in pillow block 316. A chain 317 connects sprocket 318 to the input side 319 of an angular converter 320. The output side from the converter is carried to shaft 170 through chain 321 and a driving connection between shaft 170 and camshaft 178 is provided by means of chain 322. Shaft 178 is journaled in pillow blocks 323 and 324 and carries a plurality of cams 325, 326, 327, 328, 329, 330 (FIG. 20). Each of the above cams operates suitable cam followers 331, 332, 333, 334, 335, and 336 which, in turn, control the various microswitches for the actuating circuits as will be described more fully in conneciton with FIG. 39. In FIG. 21 the right hand end of shaft 170 is shown journaled in bearings 337 and 338 and also carrying the right hand cams 339 and 340 (see also FIG. 19) which correspond to the cams 167 and 341 respectively in FIG. 17. Cams 340 and 341 actuate the vertically movable anvil 192 which clamps the edge of the stuffing material 108 against the underside of the upper jaws 190 and 191 as shown in the top view of FIG. 15. Cam followers 193, 193 control the movement of anvil 192.

The main driveshaft 348 from motor 235 is provided with a second sprocket 349 (FIGS. 21 and 9) which drives jackshaft 211 through upper sprocket 350. Double sprocket 210 at the opposite end of jackshaft 211 drives the rapier chain 233 extending between sprockets 234 and 243.

The knife motor 144 mounted on carriage 200 is oscillated on ways 201 and 202 by means of the chain 205 spanning sprockets 207 and 210. Driving sprocket 210 is mounted on shaft 353 journaled in bearings 354m 354, one of which is an integral part of the housing for the knife chain drive motor 212. Carriage 200 is driven from chain 205 through a link 355 and roller 356 which operates in a vertical groove 357 in carriage 200 so that the chain 205 stops but never reverses.

TIMING CYCLE AND WIRING DIAGRAM

FIG. 38 shows the relative actuation of the fabric feed mechanism, the foam rubber flipper, the rapier, the head clamp, the selvedge gripper, the tail clamp, the stuffing roller feed mechanism, the circular knife and the clamping anvil for the stuffing.

FIG. 39 shows the circuitry between the main motor 235, the fabric feed motor 129, the knife carriage motor 212, the knife motor 144 and the takeup motor 122. When the main switch 358 is closed the operator presses the starting switch 359 to close a circuit to the main relay 360. This operates a holding circuit in the relay which maintains the motor 235 operating until switch 359 is actuated to open the holding circuit all in accordance with customary practice. The fabric feed cam 325 rotates to close a circuit to a relay 361 through contacts 362. This, in turn, starts the fabric feed motor 129 which is maintained operating through a holding circuit in relay 161. A jog switch 363 having a forward and reverse push button is connected in the circuit to the motor 129 so that the operator may jog the fabric F forward or backward as may be desired to facilitate starting up the machine for a new fabric roll 115.

Cam 326 likewise rotates on camshaft 178 to close a circuit to a relay 365 through contacts 366. Cam 327 controls the holding circuit to relay 365 through normally closed contacts 367. Actuation of relay 365 simultaneously operates the air cylinders 298, and 266 and 256 respectively through conventional solenoid controlled four way valves in the well known manner. Cam 328 closes the circuit to relay 370 through contacts 317 and the air cylinder 248 for the tail clamp which is actuated through a holding circuit in relay 370 and which is in turn broken when 329 opens normally closed contact 372. The last cam 330 controls the operation of the knife carriage motor 212 through a relay 373 having a holding circuit controllable through contacts 374 which insure that the intermittent operation of motor 212 is in proper timed relation to that for the oher functions. A pair of normally closed switches 214, 214 may be used in the holding circuit to provide a dwell for the knife at the end of each stroke. The knife motor 144 which drives the knife 142 rotates at all times when the main switch 358 is closed and the fabric takeup motor 122 likewise operates on the fabric takeup to provide the desired tension therein except when stoped for filling. This is connected by means of an overload clutch 375 in the driving connections to the motor 122 and takeup rollers 127 and 128.

OPERATION

In operation the fabric F advances over the table 126 and the first pleat may be stuffed by jogging the machine by switch 363. As soon as this first pleat is filled, the machine is jogged until the sensor 301 is lifted over the filled pleat and actuates microswitch 307 which closes a by-pass circuit around relay 361. The stuffing feed from the supply 108 then advances through operation of shaft 170 as described above to advance the previously cut edge of the stuffing to the cutting position as shown in FIG. 15. The knife then makes its cutting traverse from right to left to sever a strip 103 of stuffing material of the proper width to be inserted in the pre-registered pleat. At any point after the knife has completely severed the strip, the flipper elevates the leading end of the strip to a raised position so that as the rapier advances the strip will be impaled and fold back on top of the rapier for injection into the pleat. Meanwhile the head clamp and the selvedge clamp have been actuated to retain the forward selvedge edge of the fabric in proper alignment and to prevent buckling. The rapier continues to advance into the pleat carrying the folded over stuffer strip along with it. After the strip and rapier emerge from the pleat the rapier continues its travel sufficiently far for the folded over strip to flip forward to the normal flat position. The rear clamp is then actuated to retain the fabric during withdrawal of the rapier. After the rapier has fully returned to its initial position, the sequence is automatically repeated since the rapier carriage continues to move so long as the main switch 358 is closed. As noted above, the two limit switches 214, 214 one of which is shown in FIG. 19, control the traverse of the knife carriage which has an independent motor 212 actuated by cam 330.

AUTOMATIC MULTIPLE WIDTH AND MULTIPLE THICKNESS STUFFING MACHINE

Carrying forward the invention described above in connection with FIGS. 1–39, we have also added considerably to the versatility of the automatic machine by providing a selective programming system which permits the filling of variable widths and variable thickness pleats in accordance with a pre-determined program. FIG. 40 is a top view of an unheated stuffed fabric as it comes from our improved machine, and the sectional view of FIG. 41 shows a series of varying width pleats that have been stuffed selectively with the proper width of strip stuffing material. An important use for upholstery material having variable thickness resides in the ability to provide a simulated contoured chair back for furniture or automobiles of the type now referred to as a "bucket" seat. If the seat back is planar, the contour formed by the variable thickness stuffing pleats gives a curved effect which is very desirable and comfortable for an automobile operator. In addition, if the seat back is pre-curved, the use of our improved thickness fabric permits considerable enhancement of the curve as is desirable in today's market. FIG. 42 is a view generally similar to FIG. 41, but after the fabric has been heat treated to shrink the backing warp yarns 385 as compared to the relatively non-shrinkable top warp yarns 386. In FIG. 41 the stuffing is all of substantially the same thickness. The widest pleat and stuffing is shown at 387, the middle size at 388 and the smallest at 389. An automobile bucket seat having the back formed of a material shown in FIG. 42 is illustrated in FIG. 43, and it will be understood that the new fabric produced with our improved machine is adaptable for many other uses than automobile seats.

In FIG. 44 we show a top view of a multi-width automatic pleat stuffing machine in which the unfilled fabric F2 is carried from a supply roll, now shown, over the pleat filling table 390 so that the pockets in fabric F2 may register at the proper time in front of a multi-head stuffing station 391. A suitable takeup pin roller 392 (FIG. 47) carries the filled fabric F2 under a guide roller 393 and a trailing guide roller 394.

The fabric F2 as shown in FIG. 40, but before the pleats are filled, is designed to have the desired sequence of wide, medium and narrow pleats for example, such as pleats 387, 388 and 389 shown as filled in FIG. 41. It will be understood that the arrangement of the pleats can be any desired sequence to provide whatever type of pattern is needed. The sequential arrangement of the pleat thickness shown in FIG. 42 is merely illustrative of one arrangement of the pleats for the purpose of providing the contour.

Referring now to FIGS. 44 and 45, our improved machine is provided with a plurality of loading stations which may, of course, be any desired number but in the present machine we employ a narrow filling station 396, a medium filling station 397, and a wide filling station 398. The range of widths capable of being used in the present machine is from 1" to 4" and this includes a plus or minus ¼" overlap. Thus it will be seen that a single machine capable of continuously and automatically inserting any desired width of stuffing provides an extremely wide combination of effects that can be achieved.

MULTI-SHEET STUFFING FEED

Now with reference specifically to FIGS. 44b and 45b, the filling or stuffing preparation side of the machine comprises a plurality (in this case three) supply rolls of different thickness stuffiny material. Any foamed or resilient material generally used for this purpose is satisfactory if capable of being puroduced in sheet or strip form. Natural or synthetic foam or sponge rubber, polyurethane and polyethylene may be cited as examples. These are shown in FIG. 49 in which supply roll 400 carries the thickest material, roll 401 the medium thickness material and 402 the thinnest material. These rolls can be mounted on any suitable stand 403 or other framework in such a way that the takeup from the rolls is fed over driven feed rolls 404, 404' and 404" and a stationary guide 407. From thence the stuffing sheets are delivered to the cutting head of the machine as shown in FIG. 48. Each sheet of material, one of which is designated 410 is fed over the padded feed rollers to direct and press the sheet of foam material 410 against a curved fixed guide plate 413. Proper clearance and pressure between the upper feed roller 412 and plate 413 is achieved by means of eccentrics 414, 414 journaled on a shaft 415 and rotatable by means of a hand wheel 416. Eccentrics 414, 414 are turned to retracted position when lacing up a new sheet whereupon it is returned to the proper setting for the thickness of that sheet and this can be readily determined by the operator by means of suitable calibrations on a dial 417 and pointer 418. The guide plates 413 direct the edge of the stuffer sheet to a cutting position under the rotary knives 420 which are mounted in guards 421 and operated by means of motors 422 suspended in a travelling carriage 423 which is movable horizontally on ways or rails 424 and 425. The travel of the knife carriage 423 is controlled by means of driving chains 426. A knife carriage motor for drive 427 is mounted on an elevated platform 428 (FIG. 45b) and is drivingly connected to chain 426 through sprockets 429, chain 430 and sprocket 431. Upon actuation of motor 427, the carriage 423 traverses the length of ways or rails 424 and 425 until the cam 432 strikes the far limit switch 433 (FIG. 45a). A second limit switch 434 controls the initial position of the knife at the right hand end of the carriage.

The fabric feed is accurately and intermittently determined by means of an air cylinder 435 (FIGS. 45b and 54) for each of the fabric widths. This cylinder has a piston rod 436 connected to an arm 437 of a one way roller clutch 438 which is adjustably mounted on the extended trunnion portion 440 of feed roll 412. Adjustment of the degree of feed is achieved by means of a slotted link connection at 441 and a knurled thumbnut 442 for sliding the link 441 in an elongated recess in the arm 437 to provide variations in the length of the arc through which the roll 412 turns upon every actuation of cylinder 435. Oscillation of the arm 437 from the full line position of FIG. 56 to the broken line position indicated, results in the partial rotation of the feed roll 412 sufficient to advance the web 410 a predetermined amount such as the width of a strip of foam necessary to fill a pleat at the corresponding filling station. The retractive stroke of the piston 436 simply returns the arm to the reset position. A second roller clutch 443 also secured on the outboard end of trunnion 440 has its housing secured against rotation by attachment to the fixed frame of the machine through a swing link 439. This clutch is opposite in action to clutch 438 being simply a holding device to prevent retroactive movement of the feed roll 412 when the arm 437 is returning to its reset position.

The shaft 440 for the upper feed roll 412 is interconnected with the shaft 441 for the lower feed roll 411 by means of sprockets 447, 448 and chain 449. It will be noticed that oscillation of piston rod 436, acting through one way clutch 438, advances the feed roll 411 and 412 a pre-determined increment in accordance with the setting of the connection 441. FIG. 50 shows the feed rolls in a minimum adjusted position to accommodate a sheet of stuffing material 410 approximately ½" thick. FIG. 51 shows the cam 414 set at a medium adjusted position for a thickness of approximately ¾" and the cam may be farther turned if desired to provide the proper setting for thickness on the order of 1½".

To describe the various related structure incident to thickness adjustment, reference is made to FIGS. 50–56. Eccentric 414 on shaft 415 bears against an angle foot 450 which is secured to the upper feed roll bearing housings 451 by screws 452, 452. This, in turn, causes the feed roll support brackets 453 to pivot with respect to each other on a pin 454. Since eccentrics 414, 414 are of constant diameter, the drive chain 449 will be properly tensioned at all times because the spacing between the centers of the sprockets 447 and 448 is constant. The shaft 440 (FIG. 56) is mounted on the swing link 439 to compensate for the above described adjusting movement of eccentrics 414. The adjusting structure described above is identical for each of the filling stations 396, 397 and 398. Therefore, the corresponding parts are not individually described but are designated with single and double primed reference numerals.

ACTUATION OF MOVABLE ANVIL

As in the machine previously described, it is important to maintain an anvil under the knife station to prevent buckling of the stuffing material during the cutting operation. In the present form the anvil 455 is shown in FIGS. 52 and 53 and is vertically slidable on the frame member 456 by means of slots 457, 457 which carry pins 458, 458 and backing plate 459. The anvil is slotted along its middle to accommodate the knife 420 and is also spring loaded by means of helical extension springs 460, 460. The anvil also is provided with a plurality of downwardly extending feet 465 which slide vertically in journals 466, 466. It is necessary to adjust the clearance between an anvil and the upper table 467 when the feed rollers are adjustable to accommodate a different thickness of stuffing. This is done simultaneously with the feed roller adjustment by means of a sprocket 468 pinned to shaft 415 (FIG. 54). This sprocket is connected to a larger sprocket 469 on stub shaft 470 which is journaled in brackets 471, 471 and carries crank arms 472, 472 pinned to its opposite ends and having rollers 473, 473 on which the feet 465, 465 rest. The adjusted position of shaft 470 determines the clearance for the top of the anvil 455 as its clearly shown by comparing FIGS. 50 and 51. It will be understood that the adjustment for each of the other stuffing feeds shown in FIG. 48 is identical and all parts are the same since the clearance in a horizontal direction between an anvil and the table 467 is ample to accommodate the widest desired strip to be stuffed. In this way, the machine is extremely versatile since it readily accommodates ample variations in both thickness and width in each of the various heads as may be desired.

RAPIER DRIVE

The rapier drive for our improved machine is similar to that for the single station machine described previously. Referring to FIGS. 45b, 48 and 57, each rapier filling station has a separately driven rapier with a width corresponding to the cut width of the filling or stuffing for each station. In FIG. 48 the widest rapier 480 is used in the wide filling station 398. The medium width 481 is used in filling station 397 and the narrow rapier 482 in station 396. Except for the difference in width of the rapiers the operation and actuation of each is the same. Referring to FIG. 57, rapier 482 is provided with a bifurcated standard 483 which is connected to the rapier chain 484 by means of an extended block 485 on one of the chain links. Link 486 pivotally connects the standard 483 and block 485. The block also operates a safety switch 487. The rapier chain 484 runs over the far sprocket 488 as shown in FIG. 57 and also over a corresponding sprocket 489 as shown in FIG. 45b. The drive for the rapier chain is from motor 490 through chain 491. Block 485 also actuates a similar safety limit switch 492 at the opposite extreme end of its travel. It will be understood that each of the rapier drives for filling stations 396, 397 and 398 is identical except for the width of the rapiers and the stations, so that single and double prime reference numerals are used for these corresponding parts.

THE FLIPPER

Our improved machine is also provided with a flipper of somewhat modified construction which, as in the first described machine, operates to turn up the leading end of the cut stuffer strip to position it above and around the leading end of each rapier. The flippers are actuated by a switch positioned at the far end of each knife carriage stroke so that the flipper comes up slowly during the return stroke of the knife carriage and before the rapier advances. This design reduces the time required for flipping the stuffer strip and insures accurate positioning around the leading end of each rapier. A pneumatic cylinder 495 (FIG. 57) is pivotally mounted at 496 and provided with a piston rod 497 which swings on a link 498 pivoted at 499. Link 498 carries a rack 500 which drives pinion 501 to which the flipper blade 502 is connected (FIG. 64). As shown in FIGS. 63 and 64, the flipper blade 502 is adjustably mounted on shaft 503 by screws 504, 504 and is supported in a bearing 505. Referring to FIGS. 65–68 the flipper is in its unactuated position as seen in FIG. 65 with the cut stuffer or filling strip FS positioned above the blade 502. Upon actuation of the flipper cylinder 495 blade 502 turns the leading end of the filling strip FS upwardly to the position shown in FIG. 66. The flipper then returns to its initial at rest position but the strip FS is retained on the edge of a plate 506 so that it will be engaged by the advancing rapier 482 as shown in FIG. 68. Both the plage 506 and upper and lower guides 508 and 509 are vertically adjustable to guide and retain the folded strip in position until it passes between the clamps.

SELVEDGE CLAMPS

The near double selvedge of fabric F2 is opened and clamped in an open position in the same general manner as shown in connection with our previously described machine. Referring to FIGS. 57, 58 and 62, the selvedge of the fabric is opened and maintained in an open position by means of arcuate guides 510, 510' and 510".

When the fabric feed is stopped due to the registration of one pleat to be filled at one of the filling stations, air cylinder 511 (FIG. 57) pivoted at 512 is actuated to move its piston rod 513 thereby pivoting bellcrank 514 on bearings 515 to swing upper and lower movable clamps 516 and 517 (FIG. 58) to grip the upper selvedge 518 against the upper stationary anvil 519 and to grip lower selvedge 520 against lower stationary anvil 521. See FIGS. 65, 69–71. The operation of the selvedge clamps is more clearly shown in FIGS. 65, 70 and 71. When the fabric F2 is moving to a registry position the selvedge clamp bracket 522 is pivoted to the position shown in FIG. 65 by means of bellcrank 514. The clamps 516 and 517 are mounted in bracket 522 on pins 523 and 524 so that they are permitted to pivot in the bracket under control of stop screws 525 and 526. When a pleat has been stopped in registry with its proper filling station, bellcrank 514 pivots the bracket 522 to the position shown in FIG. 70 so that upper clamp 516 which has an arcuate serrated face grips the upper selvedge 518 against the stationary anvil 519. A similar action takes place with regard to the lower clamp 517, lower selvedge 520 and lower anvil 521. The rapier continues to advance as shown in FIG. 70 pushing the filling strip FS between upper and lower clamps as well as the upper and lower anvils until the rapier and the filling strips FS enter the pleat waiting to be filled. The rapier continues to advance as shown in FIG. 71 in cooperation with the actuation of the travelling fabric clamps.

FABRIC CLAMPING SYSTEM

In order to more positively hold the fabric during the blade filling operation, our improved machine provides a travelling clamp system for each filling station which clamp moves along either side of the pleat being filled to retain it in the proper position thereby preventing buckling and any damage to the fabric as the rapier advances. At each of the filling stations we provide an elevated rail 550 (FIG. 45a) on which the hold down carriage 530 for each filling station travels. The carriage 530 is drivingly connected to a horizontal chain 531 running between sprockets 532 and 533. Sprocket 533 is mounted on a stubshaft 534 which carries sprocket 535 at its opposite end and is driven through chain 536 from sprocket 537 on countershaft 538 having a second sprocket 539 (FIGS. 44a and 46). Chain 540 carries the drive from an upper double sprocket 541 to lower sprocket 539 and the double sprocket 541 is, in turn, driven through a long chain 542 (FIG. 45b) from a sprocket 543 on stubshaft 544. Motor 490 is connected to sprocket 543 through a vertical chain 545 and gear reduction and sprocket 546 (FIGS. 44b and 45b). Carriage 530 is guided on rail 550 by a plurality of vertical rollers 563, 563 and horizontal rollers 564, 564.

Since the drive for the rapier is from motor 490, actuation of this motor initiates the travel of carriage 551 to clamp the fabric F2 on either side of the pleat by means of the pressure-urged rollers 565 and 566 mounted on trailing links 567 and 568. These links are pivoted to posts 569 and 570 on the underside of carriage 530 and are urged downwardly by means of a pneumatic diaphram chamber 571 and 572 (FIGS. 60 and 61) under control of pneumatic lines 573 and 574. The driving connection between the carriage 530 and its associated chain 531 is by means of a roller extension 575 on one of the chain links. This roller extension moves vertically in a groove 576 in the upper post 577 of carriage 530 so that the carriage traverses its forward and return strokes without the necessity for reversing motor 490.

Each carriage 530 is provided with a pair of rollers 565, 566 which run on tracks in the form of tapes 580 to prevent damage to the fabric. These tapes must, of course, be raised when the fabric is advanced and this is accomplished by means of air cylinder actuation. As shown in FIGS. 45a, 57, 58 and 59 tapes 580 are anchored to blocks 581, 581 secured to the piston rod 582 of air cylinder 583. The opposite ends of the tapes are anchored at the other side of the fabric feeding table at 584. As the rapier advances air cylinder 583 is actuated to depress the tape which bears against the top of the fabric on either side of the pleat being filled. One of the rollers 565, 566 for the narrow station may ride upon filled pleats or empty pleats depending upon the particular design of the fabric being filled. FIG. 72 shows roller 565 and its tape 580 riding on an unfilled pleat whereas roller 566 and its associated tape 580 ride on a pair of filled pleats. The pairs of rollers for each station are operated in the same manner and it will be noted that the flanges of the rollers are not sufficiently high to contact the fabric beyond the thickness of the tapes 580. In general, the pressure point for the rollers is in advance of the leading end of the rapier on the order of 2" to 6".

FAR SIDE FABRIC CLAMP

In order to retain the fabric in proper position after rollers 565 may have passed beyond the far selvedge edge of the fabric F2 and also to retain the fabric without buckling when the rapier withdraws, we provide a straddle clamp 585 for each filling station (FIGS. 45a and 73), which takes the form of a pair of L-shaped brackets pivoted to an adjustable frame member 586 at 587. The clamps are controlled through an air cylinder 588 having a piston rod 589 pinned to an arm extension of the brackets 585 at 590. The entire fabric clamp assembly or tail clamp can be adjusted by means of cap screws 591 and may be relocated on the table in accordance with the width of the fabric being filled.

FABRIC TAKEUP DRIVE AND PROGRAMMER

Referring now to FIGS. 45a, 75–82, the motor 600 (FIG. 75) drives the programming drum 601 through suitable driving connections 602, toothed belt 603, and sprockets 604 and 605. A toothed belt 606 operates the fabric takeup which comprises the pin drum 392 and guide rollers 393, 394 (FIG. 47). The programming mechanism for our improved machine comprises a drum 601 having circumferential slots 607, 608 and 609 for each filling station. Each of the slots is provided with the desired number of switch actuating lugs 615 which may be moved in the slots by pivoting the lugs on their overcenter mountings as shown in FIG. 79. A bank of switches 616, 617 and 618 is mounted adjacent the back side of the drum and have suitable electric switch actuating arms 620 and contract rollers 621. The drum 601 is mounted on a shaft 622 having an electric clutch 623 and 624 at each end, clutch 623 being interconnected between shaft 622 and sporcket 605 whereas clutch 624 interconnects shaft 622 and sprocket 625. A reversing motor 626 is connected to sprocket 625 through a timing belt 627 and sprocket 628. In order to accurately position drum 601 at its starting setting, we provide a solenoid actuated latch 630 which is pivoted in a bracket 631 and controlled by a solenoid 632. The latch cooperates with a lug 633 on the side of drum 601 as shown in FIG. 78. The latch operator (FIG. 81) is a pivotally mounted roller actuated by a cam 636 on the side of drum 601. Latch operator 635 actuates a microswitch 637 which is connected electrically to the solenoid 632. Mounted on a standard 640 is the rest switch 641 actuated by a roller pivot lever 642 and a lug 643 somewhat longer than the other lugs 615, 615 on the periphery of the drum 601. It will be understood that the circuitry of this machine is quite comparable to the circuitry illustrated and described in our single station machine and it is believed unnecessary to repeat the description thereof. However, an important feature of the multi-station machine is its ability to program the filling of the various different pleats when the proper pleat to be filled first reaches its appropriate filling station. By way of example, therefore, the arrangement of lugs 615, 615 on the periphery of drum 601 that would be required to produce the fabric of FIG. 42 is described in connection with FIGS. 77 and 82.

Referring now to FIG. 82, the top line illustrates the fabric moving from right to left and at the right hand side of the drawing the first empty pleat to be filled approaches station 396. Since this pleat which will be designated A requires a narrow stuffer, the operator aligns the fabric in proper registry at station 396 manually by jogging the machine. By starting the automatic cycle, the operator then fills pleat A at station 396. A sensor switch roller 645 initiates the cycling of the machine until the drum has made a complete revolution. Having done so, the reset switch 641 disconnects forward clutch 625 and engages reverse clutch 624 simultaneously starting the reverse motor 626. The drum then reverses its normal direction or rotation until the lug 633 strikes abutment 646 (FIG. 78). In this position, switch 637 is actuated by cam 636 to latch the drum in the starting position by means of solenoid 632 and latch 630. Also the clutches 623 and 624 are reversed. The present sequence has been deliberately selected to illustrate the fact that in the previous drum revolution the fabric F2 had not been completely filled since the last wide pleat B in the sequence (FIG. 82) is still empty although a succeeding pleat C had been filled at station 396. As the fabric continues to advance due to the recycling of drum 601, it will be seen that the last empty pleat to register with its appropriate filling station is pleat B which arrives at the wide filling station 398 in the second line of the sequence of FIG. 82. At this point, the drum stops, locks, and the filling of pleat B is completed. Sensor switch 645 which may be adjusted to be actuated either by moving from a filled pleat or to a filled pleat is shown in FIGS. 57 and 59. Switch roller 645 actuates the switch 647 which is, in turn, adjustably mounted both vertically and horizontally on frame bracket 648. Vertical adjustment is provided by means of thumb screw 649 and horizontal adjustment is provided by means of thumb screw 650. A lock bolt 651 is used to retain the switch and roller 645 in any desired adjusted position.

Referring now back to FIG. 82, the third pleat to be filled will be a narrow pleat D, the next two pleats to be filled E and F are likewise narrow and are, therefore, filled at station 396. The sixth pleat, however, is a medium size pleat G and, therefore, will be filled at station 397 since this is the first time that any medium size pleat has reached the medium size station. Progressing then to the seventh row, another narrow pleat H is filled at station 396, then a wide pleat I at row eight is filled at station 398 and in row nine a medium size pleat J is filled at station 397. The program includes a complete revolution of the drum and a complete filling cycle, but these two do not correspond around the periphery of the drum since it will be observed that there is of necessity an overlap. The last wide pleat in line nine remains empty as also shown in connection with the last wide pleat B in line one.

This programming sequence can be followed in FIG. 77, which shows that for the narrow pleats filled at station 396, pleat A is the next to be filled. The next to be filled is pleat B at station 398, then three narrow pleats D, E and F at station 396, then a middle size pleat G at station 397, then a narrow pleat H at station 396, a wide pleat I at station 398, and a middle size pleat J at station 397. It will, of course, be understood that the programming sequence may be arranged to suit any desired pattern, has a wide range of selections, and is not limited to a condition in which the positioning of the lugs on the programming drum must completely fill all the fabric that has passed the first filling station during a single revolution. It will be apparent that each and every pleat must be filled the first time that the pleat reaches its appropriate station regardless of whether this happens to be at a particular point in the revolution of the drum.

In accordance with the foregoing description, we have provided an automatic pleat filling apparatus having the ability to fill a wide range of pleats in upholstery fabric. The machine is fast, efficient and accurate, is capable of operating even though the pleats are as much as ½" out of registry with the rapier. The multi-stage machine is capable of a repeat of 40" in the fabric for one drum revolution, but it will be understood that the programming drum may be replaced with suitable magnetic tape operation, punched cards, or other control devices which may be indicated in the event that more complicated designs having longer repeats are desired.

Having thus described our invention, we claim:

1. A stuffed, pleated upholstery fabric for automobile seats and the like comprising an upper ply, an interwoven lower ply, at least one of said plies containing heat shrinkable thermoplastic yarns, a plurality of pleats formed between said plies and between the interwoven lines thereof, the pleats extending longitudinally along the outer borders of said fabric being relatively thick and wide with the pleats near the center vertical portion of said fabric being relatively thinner and narrower whereby when said fabric is applied to an automobile seat an arcuate configuration is imparted to the contour of the back and cushion portion of the seat, an elastomeric filling of a width and thickness corresponding to the width and thickness of the pleat in which the filling is positioned, said filling having a protective layer on each side of said filling.

References Cited

UNITED STATES PATENTS

| | | | |
|---|---|---|---|
| 2,147,058 | 2/1939 | Randall et al. | 161—119X |
| 2,458,588 | 1/1949 | Gordon et al. | 161—50 |
| 3,124,918 | 3/1964 | Hall et al. | 53—125 |
| 3,229,443 | 1/1966 | Fahringer | 53—125X |
| 3,266,066 | 8/1966 | Bereday | 5—361 |
| 3,266,495 | 8/1966 | Sachs | 128—479 |
| 3,293,671 | 12/1966 | Griffin | 297—457X |
| 3,389,043 | 6/1968 | Clark | 161—43 |

WILLIAM A. POWELL, Primary Examiner

U.S. Cl. X.R.

53—29, 51, 59, 123, 125; 161—89, 121, 123, 159, 166; 297—456